(12) United States Patent
Seki et al.

(10) Patent No.: US 7,060,783 B2
(45) Date of Patent: Jun. 13, 2006

(54) DIAMINE COMPOUND POLYMER HAVING CONDENSED AROMATIC GROUP

(75) Inventors: Mieko Seki, Kanagawa (JP); Hirohito Yoneyama, Kanagawa (JP); Daisuke Okuda, Kanagawa (JP); Hidekazu Hirose, Kanagawa (JP); Tadayoshi Ozaki, Kanagawa (JP); Takeshi Agata, Kanagawa (JP); Toru Ishii, Kanagawa (JP); Hiroaki Moriyama, Kanagawa (JP); Kiyokazu Mashimo, Kanagawa (JP); Katsuhiro Sato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 21 days.

(21) Appl. No.: 10/783,774

(22) Filed: Feb. 20, 2004

(65) Prior Publication Data

US 2005/0033011 A1 Feb. 10, 2005

(30) Foreign Application Priority Data

Aug. 5, 2003 (JP) .............................. 2003-205919

(51) Int. Cl.
C08G 69/26 (2006.01)
(52) U.S. Cl. ...................... 528/335; 528/341; 528/344; 528/401; 528/422
(58) Field of Classification Search ................ 528/335, 528/341, 344, 401, 422
See application file for complete search history.

(56) References Cited

U.S. PATENT DOCUMENTS 4,092,162 A 5/1978 Wright et al.

(Continued)

FOREIGN PATENT DOCUMENTS

JP 59-28903 7/1984

OTHER PUBLICATIONS

Proceedings of the 37th Applied Physics Related Associated Seminar, 31p-K-12, 1990.

(Continued)

*Primary Examiner*—Samuel A. Acquah
(74) *Attorney, Agent, or Firm*—Fildes & Outland, P.C.

(57) ABSTRACT

The present invention provides a diamine compound polymer and a method for producing the diamine compound polymer. The diamine compound polymer of the present invention has a condensed aromatic group represented by the following formulae (1-1) and (1-2).

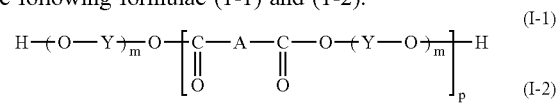

A represents a structure represented by the following formula (II-1). Y and Z represent divalent hydrocarbon groups. B and B' each independently represents a group represented by —O—(Y—O)m-H or —O—(Y—O)m-CO-Z-CO—OR', wherein R' is a hydrogen atom, an aralkyl group, an aryl group, or an aralkyl group. m represents an integer from 1 to 5; and p represents an integer from 5 to 5000.

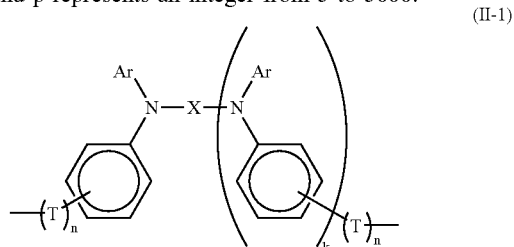

Ar represents a monovalent aromatic group. X represents a divalent condensed aromatic group. T represents a divalent linear hydrocarbon group having 1 to 6 carbon atoms or a divalent branched hydrocarbon group having 2 to 10 carbon atoms. k and n each represents an integer of 0 or 1.

7 Claims, 6 Drawing Sheets

U.S. PATENT DOCUMENTS

| | | |
|---|---|---|
| 4,801,517 A | 1/1989 | Frechet et al. |
| 4,806,443 A | 2/1989 | Yanus et al. |
| 4,806,444 A | 2/1989 | Yanus et al. |
| 4,937,165 A | 6/1990 | Ong et al. |
| 4,959,228 A | 9/1990 | Skrgatic et al. |
| 4,983,482 A | 1/1991 | Ong et al. |
| 5,034,296 A | 7/1991 | Ong et al. |

FOREIGN PATENT DOCUMENTS

| | | |
|---|---|---|
| JP | 61020953 | 1/1986 |
| JP | 63113465 | 5/1988 |
| JP | 1134456 | 5/1989 |
| JP | 1134457 | 5/1989 |
| JP | 1134462 | 5/1989 |
| JP | 4133065 | 5/1992 |
| JP | 4133066 | 5/1992 |
| JP | 5080550 | 4/1993 |

OTHER PUBLICATIONS

Nature, vol. 357, Jun. 11, 1992, pp. 477-479.

Polymer Preprints, Japan, vol. 42, No. 7, 20J-21, 1993 pp. 2860-2863.

IR SPECTRUM OF THE AMINE COMPOUND OF SYNTHETIC EXAMPLE 1

IR SPECTRUM OF THE AMINE COMPOUND OF SYNTHETIC EXAMPLE 2

IR SPECTRUM OF THE AMINE COMPOUND OF SYNTHETIC EXAMPLE 3

IR SPECTRUM OF THE AMINE COMPOUND OF SYNTHETIC EXAMPLE 4

IR SPECTRUM OF THE AMINE COMPOUND OF SYNTHETIC EXAMPLE 5

IR SPECTRUM OF THE AMINE COMPOUND OF SYNTHETIC EXAMPLE 6

IR SPECTRUM OF THE POLYMER (25) IN EXAMPLE 1

IR SPECTRUM OF THE POLYMER (34) IN EXAMPLE 2

IR SPECTRUM OF THE POLYMER (36) IN EXAMPLE 3

IR SPECTRUM OF THE POLYMER (41) IN EXAMPLE 4

IR SPECTRUM OF THE POLYMER (47) IN EXAMPLE 5

IR SPECTRUM OF THE POLYMER (44) IN EXAMPLE 6

DIAMINE COMPOUND POLYMER HAVING CONDENSED AROMATIC GROUP

STATEMENT REGARDING FEDERALLY SPONSORED RESEARCH OR DEVELOPMENT

This invention was made with Government support under Agreement No. F33615-95-D-3217 awarded by the U.S. Air Force. The Government may have certain rights in this invention.

CROSS-REFERENCE TO RELATED APPLICATIONS

This application claims benefit of and priority to Japanese Patent Application No. 2003-205919, filed on Aug. 5, 2003, which is incorporated herein by reference in its entirety for all purposes.

BACKGROUND OF THE INVENTION

1. Field of the Invention

The present invention relates to diamine compound polymers having a condensed aromatic group, which are applicable to various organic electronic devices such as organic electroluminescence elements, electrophotographic photosensitive bodies, organic thin film transistors and organic semiconductor lasers and are excellent in charge transporting ability and light emission characteristics.

2. Description of the Related Art

Charge transporting polymers represented by polyvinyl carbazole (PVK) are promising materials as photoconductive materials for electrophotographic photosensitive bodies and materials for organic electroluminescent elements as described in references known in the art (for example, see non-patent reference 1). Application of these charge transporting polymers to various organic electronic devices, such as organic thin film transistors and organic semiconductor lasers, is expected. These charge transporting polymers are formed as layers and are used as charge transport materials in the electrophotographic photosensitive bodies and organic electroluminescence elements. Such charge transport materials known in the art include charge transporting polymers represented by PVK, and dispersed low molecular charge transport materials including a charge transporting low molecular compound dispersed in a resin. The organic electroluminescence element is usually prepared by depositing a low molecular charge transport material in a vacuum.

Since various materials may be selected for constituting the dispersed low molecular charge transport materials and high performance materials can be readily obtained, the charge transport material of this type is mainly used in the electrophotographic photosensitive bodies.

While the electrophotographic photosensitive body has been used for high speed copy machines and printers in accordance with high performance of organic photosensitive bodies, current performance is not always sufficient, and more prolonged service life is urgently desired. In view of sensitivity and durability, it is mainstream for this organic photosensitive body to be a stacked type, in which the charge transporting layer is disposed on the outermost surface. This charge transport layer is formed from the dispersed low molecular charge transport material, and charge transport layers with sufficiently satisfactory performance with respect to electrical characteristics can be obtained. However, the low molecular charge transport material is poor in compatibility with a resin component constituting a matrix and the low molecular charge transport material decreases the intrinsic mechanical strength of the resin. Therefore, the charge transport layer provided on the surface of the organic photosensitive body intrinsically has poor mechanical strength and is weak with respect to abrasion.

To solve these problems, introducing an alkylene carboxylic acid ester group into the low molecular charge transport material to improve compatibility of the low molecular charge transport material with the resin component has been proposed (Japanese Patent Application Laid-Open (JP-A) Nos. 63-113465 and 5-80550). However, even though compatibility with the resin is improved, the low molecular charge transport material in which the alkylene carboxylic acid ester group is introduced tends to be difficult to crystallize due to a high freedom of molecular motion of the alkylene carboxylic acid ester group itself. Accordingly, industrial scale production of the low molecular charge transport material in which the alkylene carboxylic acid ester group is introduced is difficult and, because it is difficult to purify this charge transport material to a high degree, purification methods, such as chromatography, are necessary. Moreover, since the alkylene carboxylic acid ester group is electron attractive, mobility of charges tends to be decreased.

On the other hand, a large amount of Joules of heat is generated since the organic electroluminescence element is energized with a current density as high as several $mA/cm^2$. Morphology changes are liable to occur by crystalization of the low molecular charge transport material due to the large amount of heat generated when the dispersed low molecular charge transport material is used for the charge transport material of the organic electroluminescence element. Consequently, undesirable phenomena such as a decrease of luminance and dielectric breakdown are caused, resulting in a decrease of the service life of the element.

It has also been a problem from the view point of efficiency and service life that a material having both a charge transporting ability and a luminous property can be hardly obtained by conventional polymer materials.

On the contrary, the charge transporting polymer is being actively studied since it has a possibility of greatly improving the drawbacks described above.

Examples of such a charge transporting polymer include polycarbonate synthesized by polymerization of a specified dihydroxydiarylamine and bischloroformate (see U.S. Pat. No. 4,806,443), polycarbonate synthesized by polymerization of a specified dihydroxyarylamine and phosgene (see U.S. Pat. No. 4,806,444), polycarbonate synthesized by polymerization of bishydroxyarylamine and bisspirochloroformate or phosgene (see U.S. Pat. No. 4,801,517), polycarbonate from polymerization of a specified dihydroxydiarylamine and bishydroxyalkylarylamine, or bishydroxyalkylamine and bischloroformate, and polyester from polymerization with bisacylhalide (see U.S. Pat. Nos. 4,937,165 and 4,959,228).

Further examples include polycarbonate or polyester (see U.S. Pat. No. 5,034,296) or polyurethane (see U.S. Pat. No. 4,983,482) of arylamine having a specified fluorene skeleton; polyester having a specified bisstyrylbisarylamine as a main chain (see Japanese Patent Application Publication (JP-B) No. 59-28903); and polymers and photosensitive bodies having charge transporting substituents, such as hydrazone and triarylamine, as pendants (see JP-A Nos. 61-20953, 1-134456, 1-134457, 1-134462, 4-133065 and 4-133066, and *Proceedings of the 37$^{th}$ Applied Physics Joint Meeting* 31p-K-12, 1990)

Examples of applications of the organic electroluminescence element include organic electroluminescence elements using π-conjugate polymers represented by paraphenylenevinylene (PPV; *Nature*, Vol. 357, 477, 1992), and organic electroluminescence elements using polymers having triphenylamine introduced into the side chain of polyphosphazene (*Proceedings of the 42nd Polymer Forum* 20J21, 1993).

A lot of attention has been paid to organic semiconductors in recent years as a third semiconductor technology following compound semiconductors. Since organic transistors manufactured by taking advantage of this organic semiconductor technology are flexible, they can be used for low-end mobile information terminals such as electronic paper and printable information tags, and research and development of the organic semiconductor have been actively carried out in recent years.

Furthermore, technologies related to fiber-to-the-home (FTTH), which enables low-cost and large capacity transfer of information to ordinary homes, are being actively studied in the field of communication. Expectations for the organic semiconductor laser as a variety of cheap laser light source as one of these technologies are increasing, and the charge transporting polymer is expected to be applied to the organic transistor and organic semiconductor laser.

While various characteristic such as solubility, film deposition ability, mobility, heat resistance and matching of oxidation potential are required for the charge transporting polymer depending on its application, the properties have been usually controlled by introducing substituents. Since the property of the charge transporting polymer is correlated with the property of the charge transport monomer as a starting material, molecular design of the charge transport monomer is important.

For example, while the monomers as the starting materials of the triarylamine polymer described above are roughly classified into two groups of (1) dihydroxy arylamine and (2) bishydroxyalkyl arylamine, purification of dihydroxy arylamine is difficult since it has a readily oxidized aminophenol structure. Particularly, the compound becomes more unstable when it has a parahydroxy-substituted structure.

Moreover, since the compound has a structure in which oxygen is directly substituted to the aromatic ring, charge distribution tends to be biased due to the electron attracting property of the group, and mobility of the molecule is liable to be reduced.

On the other hand, with respect to bishydroxyalkyl arylamine, although the effect of the electron attracting property of oxygen is canceled with the methylene group, synthesis of the monomer is difficult. Since both bromine and iodine are reactive in the reaction between diarylamine or diarylbenzidine and 3-bromoiodobenzene, the product tends to be a mixture to cause a decrease of reaction yield. In addition, since alkyllithium and ethylene oxide used for substituting bromine with lithium is dangerous and highly toxic, careful handling of these compounds is required.

The π-conjugate polymers represented by paraphenylenevinylene (PPV) described above, and the organic electroluminescence elements taking advantage of the charge transporting polymers having triphenylamine introduced into the polyphosphazene side chain involve the problems of color tone, luminous intensity and durability.

Accordingly, developments of the charge transport materials being easy for synthesis and having high charge transporting ability and excellent light emitting characteristics have been desired for developing the organic electronic devices such as organic electroluminescence elements having high luminance and excellent in safety in repeated uses.

As described above, all the fundamental properties, such as mobility, quantum efficiency, productivity, safety and easy handling, required for the charge transport material for utilizing in various application fields could not be simultaneously satisfied in high level in the conventional charge transporting polymer, because synthesis of the polymer was difficult, stability of the materials is poor, characteristics as the charge transport material such as mobility were poor, and the material is toxic.

Furthermore, the conventional charge transporting polymer has not been suitable for the application to the organic electronic device using the charge transport material such as the organic electroluminescence element.

The present invention is provided in view of the problems as described above. The invention provides a diamine compound polymer having condensed aromatic groups that is able to readily and simultaneously satisfy the fundamental properties required for the charge transport material, for example mobility, quantum efficiency, productivity, stability and easy handling, and is applicable to various organic electronic devices. Further, the invention provides an organic electroluminescence element, electrophotographic photosensitive body, field-effect transistor and semiconductor laser using the polymer.

SUMMARY OF THE INVENTION

The inventors of the invention have found, through intensive studies for solving the drawbacks above, that novel diamine compound polymer having condensed aromatic groups represented by the following structural formula (I-1) or (I-2) can be readily produced, and that the polymer is excellent in charge transporting ability, light emitting characteristics and film deposition property. Thus, the inventors have completed the invention.

Namely, one aspect of the present invention is a diamine compound polymer comprising a condensed aromatic group selected from the groups represented by the following formulae (I-1) and (I-2):

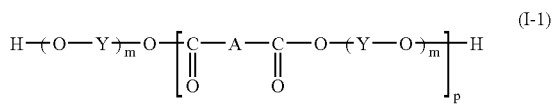

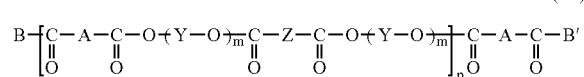

wherein A represents a structure represented by the following formula (II-1); Y and Z represent divalent hydrocarbon groups; B and B' each independently represents a group represented by —O—(Y—O)m-H or —O—(Y—O)m-CO—Z-CO—OR', wherein R' is a hydrogen atom, an aralkyl group, a substituted or non-substituted aryl group, or a substituted or non-substituted aralkyl group; m represents an integer from 1 to 5; and p represents an integer from 5 to 5000;

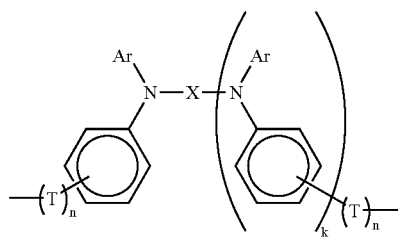

wherein Ar represents a substituted or non-substituted monovalent aromatic group; X represents a substituted or non-substituted divalent condensed aromatic group; T represents a divalent linear hydrocarbon group having 1 to 6 carbon atoms or a divalent branched hydrocarbon group having 2 to 10 carbon atoms; and k and n each represents an integer of 0 or 1.

Another aspect of the present invention is a method for producing the diamine compound polymer having the condensed aromatic group selected from the groups represented by the formulae (I-1) and (I-2), the method comprising the step of polymerizing at least one of the monomers selected from the groups represented by the following formulae (VII-1) and (VIII-1):

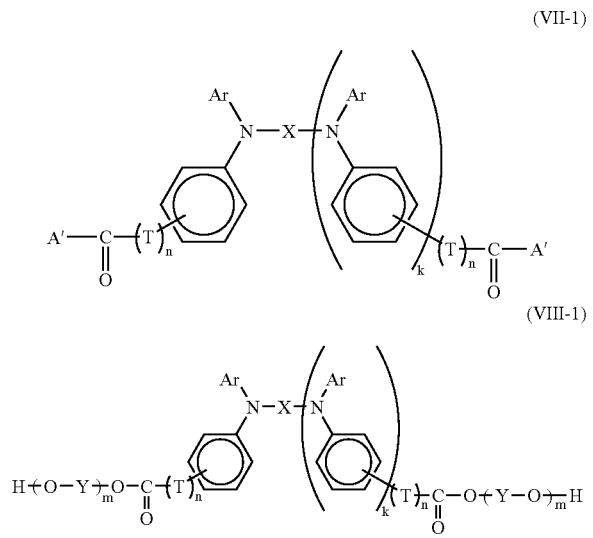

wherein A' represents a hydroxyl group, a halogen atom or a group represented by —O—$R_4$, wherein $R_4$ is an alkyl group, a substituted or non-substituted aryl group or an aralkyl group; Y represents a divalent hydrocarbon group; and m represents an integer from 1 to 5.

DETAILED DESCRIPTION OF THE INVENTION

Figure 1:
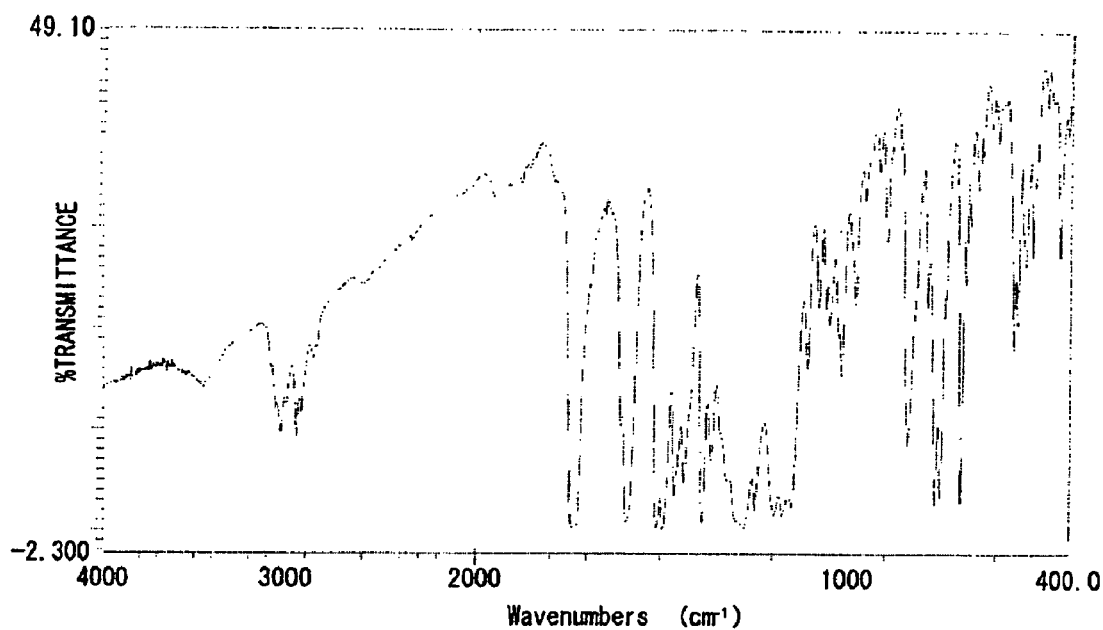
FIG. 1 is an IR spectrum of the amine compound in synthetic example 1.

The diamine compound polymer according to the present invention having condensed aromatic groups will be described below.

The diamine compound polymer of the invention is a diamine compound polymer comprising a condensed aromatic group selected from the groups represented by the following formulae (I-1) and (I-2).

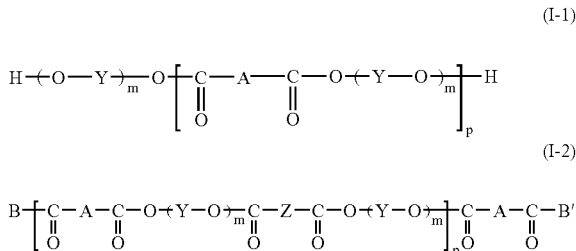

In the formulae, A represents a structure represented by the following formula (II-1); Y and Z represent divalent hydrocarbon groups; B and B' each independently represents a group represented by —O—(Y—O)m-H or —O—(Y—O)m-CO-Z-CO—OR', wherein R' is a hydrogen atom, an aralkyl group, a substituted or non-substituted aryl group, or a substituted or non-substituted aralkyl group; m represents an integer from 1 to 5; and p represents an integer from 5 to 5000.

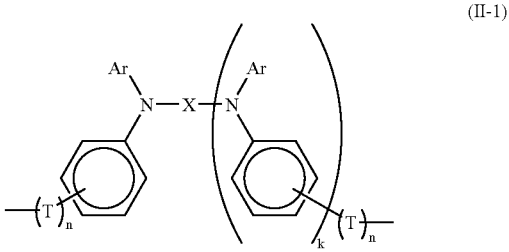

In the formula (II-1), Ar represents a substituted or non-substituted monovalent aromatic group; X represents a substituted or non-substituted divalent condensed aromatic group; T represents a divalent linear hydrocarbon group having 1 to 6 carbon atoms or a divalent branched hydrocarbon group having 2 to 10 carbon atoms; and k and n each represents an integer of 0 or 1.

Examples of the groups represented by X, Y, Z, Ar and T in the formulae (I-1) and (I-2) are as follows.

Examples of X include the group represented by the following formulae (IV-1) to (IV-12):

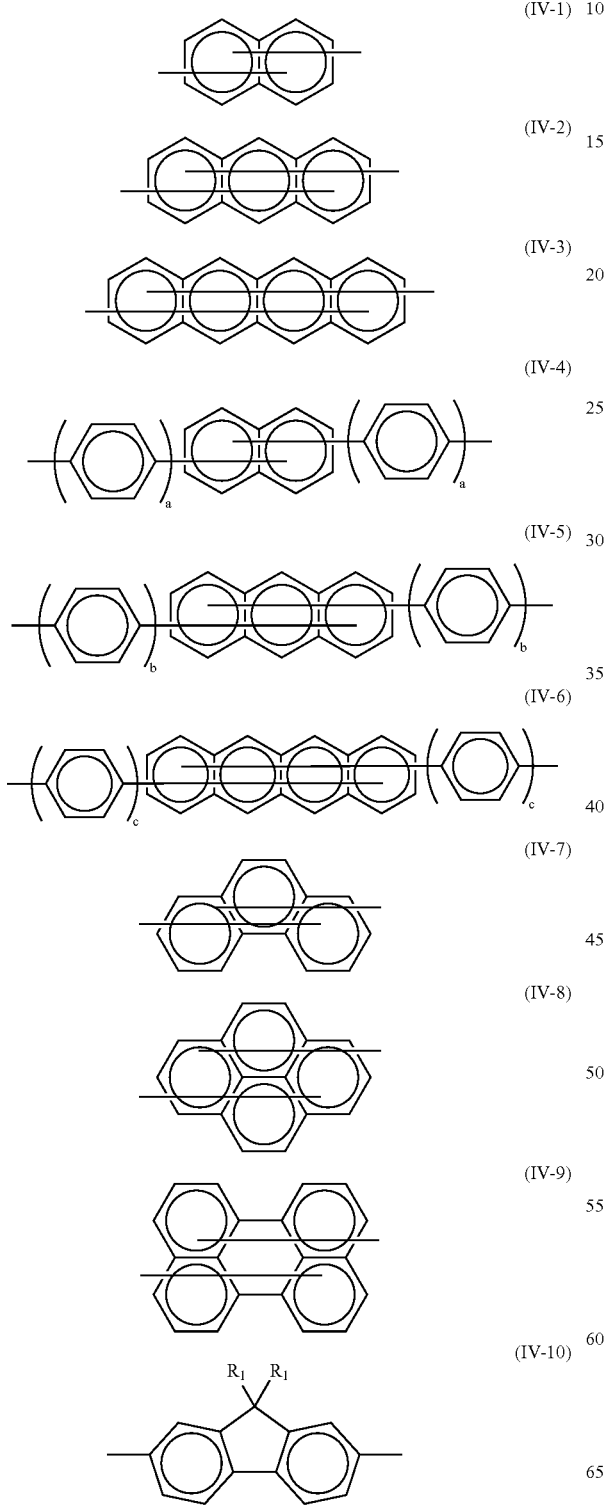

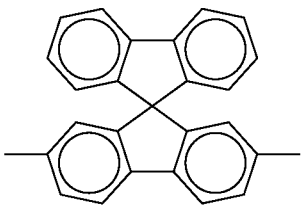

In the formula (IV-10), $R_1$ represents a hydrogen atom, an alkyl group, a substituted or non-substituted aryl group or a substituted or non-substituted aralkyl group; and a, b and c represented in the formulae (IV-4) to (IV-6) each independently represents an integer from 0 to 5.

It is preferable that, in view of stability and high mobility, X is bonded to the nitrogen atoms in the formula (II-1) at positions 1 and 4 or positions 2 and 6 in the formula (IV-1). In addition, it is preferable that X is bonded to the nitrogen atoms in the formula (II-1) at positions 9 and 10 in the formula (IV-2) by the same reasons.

Examples of Y and Z include the group represented by the following formulae (V-1) to (V-7):

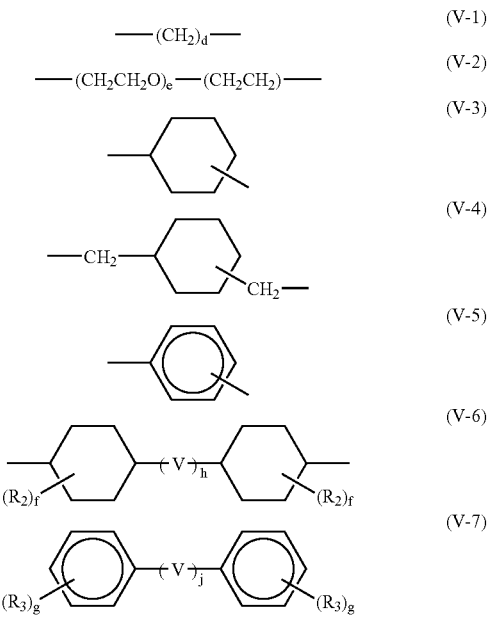

In the formulae (V-1) to (V-7), $R_2$ and $R_3$ each represents a hydrogen atom, an alkyl group having 1 to 4 carbon atoms, an alkoxy group having 1 to 4 carbon atoms, a substituted or non-substituted phenyl group, a substituted or non-substituted aralkyl group, or a halogen atom; d and e each represents an integer from 1 to 10; f and g each represents an integer of 0, 1 or 2; h and i each represents an integer of 0 or 1; and V represents a group selected from the following formulae (VI-1) to (V-10).

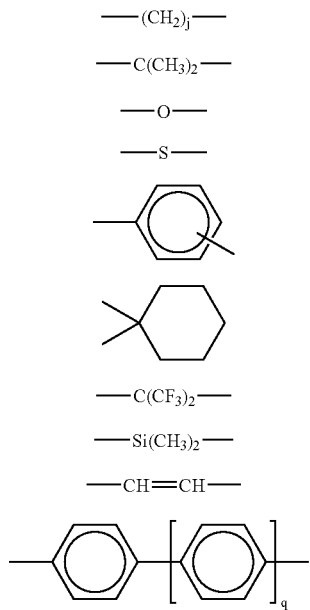

(VI-1)
(VI-2)
(VI-3)
(VI-4)
(VI-5)
(VI-6)
(VI-7)
(VI-8)
(VI-9)
(VI-10)

In the formulae (VI-1) to (VI-10), j represents an integer from 1 to 10; and q represents an integer from 1 to 3.

Ar represents a substituted or non-substituted monovalent aromatic group. Ar preferably contains 1 to 10 aromatic rings. Examples of such aromatic groups include substituted or non-substituted phenyl groups; aromatic groups comprising condensed or polycyclic rings such as biphenyl groups, terphenyl groups, naphthyl groups, phenanthlenyl groups, anthracenyl groups, pyrenyl groups, fluorenyl groups and stilbenyl groups; and heterocyclic groups such as substituted or non-substituted pyrrole, furan, thiophene, imidazole, oxazole, thiazole, pyrazole, pyridine and quinoline rings.

Examples of the substituent of the aromatic groups include a hydrogen atom, and an alkyl group, an alkoxy group, an aryl group, an aralkyl group, a substituted amino group, and a halogen atom. The alkyl group preferably has 1 to 10 carbon atoms, and examples of the alkyl group include methyl, ethyl, propyl and isopropyl groups. The alkoxy group preferably has 1 to 10 carbon atoms, and examples of the alkoxy group include methoxy, ethoxy, propoxy and isopropoxy groups.

The aryl group preferably has 6 to 20 carbon atoms, and examples of the aryl group include phenyl and toluyl groups. The aralkyl group preferably has 7 to 20 carbon atoms, and examples of the aralkyl group include benzyl and phenethyl groups. Examples of the substituent of the substituted amino group include alkyl, aryl and aralkyl groups as described above.

T represents a divalent linear hydrocarbon group having 1 to 6 carbon atoms or a divalent branched hydrocarbon group having 2 to 10 carbon atoms, and is preferably selected from the divalent linear hydrocarbon group having 2 to 6 carbon atoms or divalent branched hydrocarbon group having 3 to 7 carbon atoms. Examples of the structure of T are as follows:

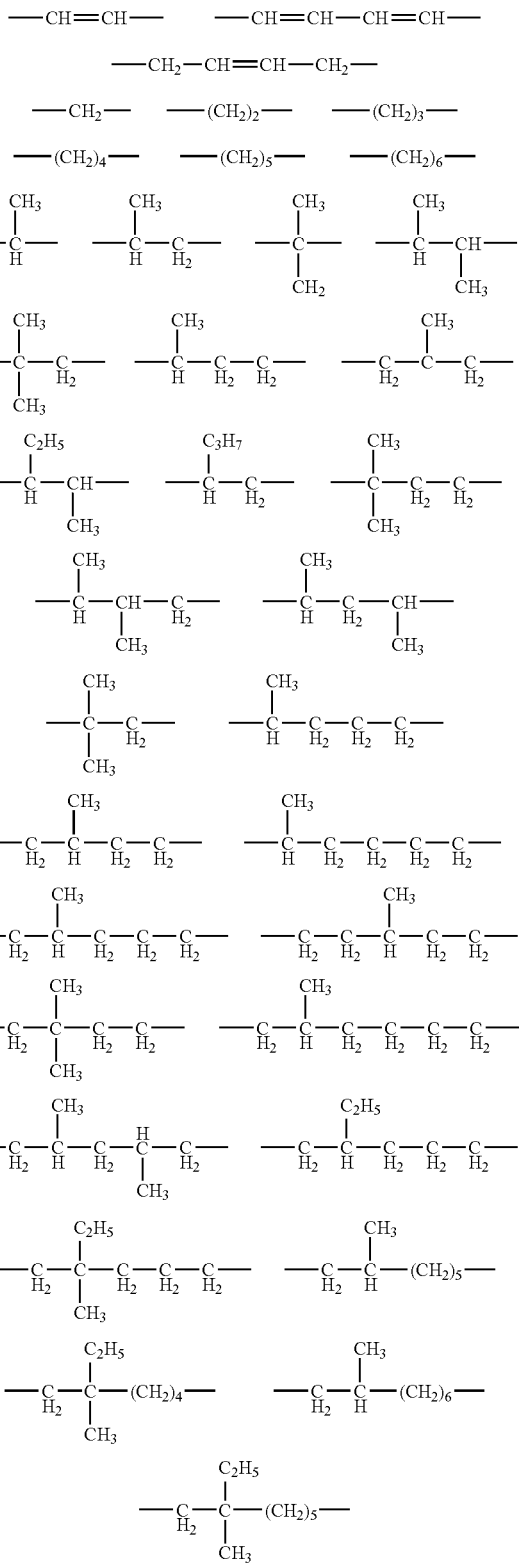

While the degree of polymerization (p) of the diamine compound polymer of the invention having the condensed aromatic group described above is preferably in a range of 5 to 5,000, it is more preferably in a range of 10 to 1,000 for the reasons of film deposition ability and stability. It is generally preferable that the weight average molecular weight Mw is in a range of 10,000 to 300,000.

The molecular structure, degree of polymerization and molecular weight of the diamine compound polymer of the invention having the condensed aromatic group as described above may be appropriately selected so that optimum characteristics can be obtained depending on the application fields of the polymer.

While examples of the compounds having the structure represented by the formula (I-1) in the diamine compound polymer of the invention having the condensed aromatic group are shown in Tables 1 to 12, the compounds are not restricted thereto. "BP" in Tables 1 to 12 means a bonding position of X to the nitrogen atoms in the formula (II-1).

Among these compounds, the diamine compound polymer having the condensed aromatic group in which X has a naphthyl, anthracenyl or fluorenyl structure represented by the following structural formula (III-1), (III-2) or (III-3) is particularly preferable since it has high mobility and quantum efficiency with excellent practical applicability.

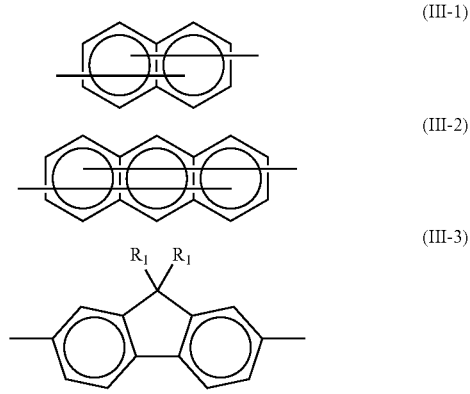

In the formula (III-3), $R_1$ represents a hydrogen atom, an alkyl group, a substituted or non-substituted aryl group, or a substituted or non-substituted aralkyl group.

TABLE 1

| Compound | A | | | | | | | | | |
|---|---|---|---|---|---|---|---|---|---|---|
| | X | Ar | T | BP | k | n | Y | Z | m | p |
| 1 | | | — | 3 | 0 | 0 | —CH$_2$CH$_2$— | — | 1 | 110 |
| 2 | | | — | 3 | 0 | 0 | | — | 1 | 88 |
| 3 | | | — | 3 | 0 | 0 | —CH$_2$CH$_2$— | — | 1 | 135 |
| 4 | | | —CH$_2$CH$_2$— | 3 | 0 | 1 | —CH$_2$CH$_2$— | — | 1 | 98 |
| 5 | | | | 3 | 0 | 1 | —CH$_2$CH$_2$— | — | 2 | 110 |
| 6 | | | —CH$_2$CH$_2$— | 3 | 0 | 1 | —CH$_2$—C(CH$_3$)(CH$_3$)—CH$_2$— | — | 1 | 65 |

TABLE 2

| Compound | A | | | | | | | | | |
|---|---|---|---|---|---|---|---|---|---|---|
| | X | Ar | T | BP | k | n | Y | Z | m | p |
| 7 | | | — | 4 | 0 | 0 | —CH$_2$CH$_2$— | — | 1 | 85 |
| 8 | | | — | 4 | 0 | 0 | —CH$_2$CH$_2$— | — | 1 | 103 |
| 9 | | | — | 4 | 0 | 0 | —CH$_2$CH$_2$— | — | 1 | 84 |
| 10 | | | —CH$_2$CH$_2$— | 4 | 0 | 1 | —CH$_2$CH$_2$— | — | 1 | 77 |
| 11 | | | —CH$_2$CH$_2$— | 4 | 0 | 1 | —CH$_2$CH$_2$— | — | 1 | 108 |
| 12 | | | | 4 | 0 | 1 | —CH$_2$CH$_2$— | — | 1 | 99 |
| 13 | | | —CH$_2$CH$_2$— | 4 | 0 | 1 | —CH$_2$CH$_2$— | — | 1 | 97 |

TABLE 3
| | A | | | | | |
|---|---|---|---|---|---|---|
| Compound | X | Ar | T | BP | k | n |
| 14 | | | —CH$_2$CH$_2$— | 4 | 0 | 1 |
| 15 | | | —CH$_2$CH$_2$— | 4 | 0 | 1 |
| 16 | | | | 4 | 0 | 1 |
| 17 | | | —CH$_2$CH$_2$— | 4 | 1 | 1 |
| 18 | | | —CH$_2$CH$_2$— | 4 | 1 | 1 |
| 19 | | | | 4 | 1 | 1 |
| 20 | | | 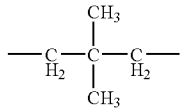 | 4 | 1 | 1 |
| Compound | Y | Z | m | p |
|---|---|---|---|---|
| 14 | | — | 1 | 86 |
| 15 | | — | 1 | 73 |
| 16 | —CH$_2$CH$_2$— | — | 1 | 65 |
| 17 | —CH$_2$CH$_2$— | — | 1 | 145 |
| 18 | —CH$_2$CH$_2$— | — | 1 | 78 |
| 19 | —CH$_2$CH$_2$— | | 1 | 102 |
| 20 | | — | 1 | 97 |
TABLE 4
| | A | | | | | |
|---|---|---|---|---|---|---|
| Compound | X | Ar | T | BP | k | n |
| 21 | | | —CH$_2$CH$_2$— | 4 | 1 | 1 |
| 22 | | | —CH$_2$CH$_2$— | 4 | 1 | 1 |
| 23 | | | —CH$_2$CH$_2$— | 4 | 1 | 1 |
| 24 | | | —CH$_2$CH$_2$— | 4 | 1 | 1 |
| 25 | | | 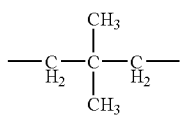 | 4 | 1 | 1 |
| 26 | | | —CH$_2$CH$_2$— | 4 | 1 | 1 |
| Compound | Y | Z | m | p |
|---|---|---|---|---|
| 21 | —CH$_2$CH$_2$— | — | 1 | 163 |
| 22 | —CH$_2$CH$_2$— | — | 1 | 101 |
| 23 | | | 1 | 100 |
| 24 | | — | 1 | 98 |
| 25 | —CH$_2$CH$_2$— | — | 1 | 106 |
| 26 | —CH$_2$CH$_2$— | — | 1 | 163 |

TABLE 5

| Compound | A | | | BP | k | n |
|---|---|---|---|---|---|---|
| | X | Ar | T | | | |
| 27 | | | —CH$_2$CH$_2$— | 4 | 1 | 1 |
| 28 | | | —CH$_2$CH$_2$— | 4 | 1 | 1 |
| 29 | | | —CH$_2$CH$_2$— | 4 | 1 | 1 |
| 30 | | | —CH$_2$CH$_2$— | 4 | 1 | 1 |
| 31 | | | —CH$_2$CH$_2$— | 4 | 1 | 1 |
| 32 | | | | 4 | 1 | 1 |

| Compound | Y | Z | m | p |
|---|---|---|---|---|
| 27 | —CH$_2$CH$_2$— | — | 1 | 125 |
| 28 | —CH$_2$CH$_2$— | — | 1 | 100 |
| 29 | —CH$_2$CH$_2$— | | 1 | 95 |
| 30 | | | 1 | 84 |
| 31 | —CH$_2$CH$_2$— | — | 1 | 56 |
| 32 | —CH$_2$CH$_2$— | — | 1 | 70 |

TABLE 6

| Compound | A | | | BP | k | n |
|---|---|---|---|---|---|---|
| | X | Ar | T | | | |
| 33 | | | —CH$_2$CH$_2$— | 4 | 1 | 1 |
| 34 | | | —CH$_2$CH$_2$— | 3 | 1 | 1 |
| 35 | | | —CH$_2$CH$_2$— | 4 | 1 | 1 |
| 36 | | | —CH$_2$CH$_2$— | 4 | 1 | 1 |
| 37 | | | $-\underset{H_2}{C}-\underset{\underset{CH_3}{\overset{CH_3}{|}}}{C}-\underset{H_2}{C}-$ | 4 | 1 | 1 |
| 38 | | | —CH$_2$CH$_2$— | 3 | 1 | 1 |
| 39 | | | —CH$_2$CH$_2$— | 4 | 1 | 1 |
| 40 | | | —CH$_2$CH$_2$— | 4 | 1 | 1 |

| Compound | Y | Z | m | p |
|---|---|---|---|---|
| 33 | —CH$_2$CH$_2$— | — | 1 | 199 |
| 34 | —CH$_2$CH$_2$— | | 1 | 82 |
| 35 | —CH$_2$CH$_2$— | — | 1 | 38 |
| 36 | —CH$_2$CH$_2$— | — | 1 | 40 |
| 37 | —CH$_2$CH$_2$— | | 1 | 105 |
| 38 | | — | 1 | 123 |
| 39 | —CH$_2$CH$_2$— | — | 1 | 106 |
| 40 | —CH$_2$CH$_2$— | — | 1 | 28 |

TABLE 7
| Compound | A | | | |
|---|---|---|---|---|
| | X | Ar | T | BP |
| 41 | | | —CH₂CH₂— | 4 |
| 42 | | | | 4 |
| 43 | | | | 4 |
| 44 | | | | 4 |
| 45 | | | 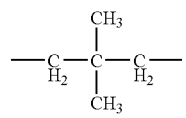 | 4 |
| 46 | | | —CH₂CH₂— | 4 |
| Compound | A | | | | | |
|---|---|---|---|---|---|---|
| | k | n | Y | Z | m | p |
| 41 | 1 | 1 | | — | 1 | 95 |
| 42 | 1 | 1 | | — | 1 | 88 |
| 43 | 1 | 1 | —CH₂CH₂— | — | 1 | 100 |
| 44 | 1 | 1 | —CH₂CH₂— | — | 1 | 57 |
| 45 | 1 | 1 | —CH₂CH₂— | — | 1 | 108 |
| 46 | 1 | 1 | —CH₂CH₂— | — | 1 | 67 |
TABLE 8
| Compound | A | | | | | | | | | |
|---|---|---|---|---|---|---|---|---|---|---|
| | X | Ar | T | BP | k | n | Y | Z | m | p |
| 47 | | | —CH₂CH₂— | 4 | 1 | 1 | —CH₂CH₂— | — | 1 | 140 |
| 48 | | | —CH₂CH₂— | 4 | 1 | 1 | —CH₂CH₂— | — | 1 | 123 |
| 49 | | | —CH₂CH₂— | 4 | 1 | 1 | —CH₂CH₂— | — | 1 | 123 |
| 50 | | | —CH₂— | 3 | 1 | 1 | —CH₂CH₂— | — | 1 | 105 |
| 51 | | | —CH₂CH₂— | 3 | 1 | 1 | —CH₂CH₂— | — | 1 | 84 |
| 52 | | | —CH₂— | 4 | 1 | 1 | —CH₂CH₂— | — | 1 | 95 |
TABLE 9
| Compound | A | | | | | | | | | |
|---|---|---|---|---|---|---|---|---|---|---|
| | X | Ar | T | BP | k | n | Y | Z | m | p |
| 53 | | | —CH₂— | 4 | 1 | 1 | —CH₂CH₂— | — | 1 | 100 |
| 54 | | | —CH₂CH₂— | 4 | 1 | 1 | —CH₂CH₂— | — | 1 | 95 |
| 55 | | | —CH₂— | 4 | 1 | 1 | —CH₂CH₂— | — | 1 | 84 |
| 56 | | | —CH₂CH₂— | 4 | 1 | 1 | —CH₂CH₂— | — | 1 | 88 |
| 57 | | | —CH₂CH₂— | 4 | 1 | 1 | | — | 1 | 96 |

TABLE 10
| Compound | A | | | BP |
|---|---|---|---|---|
| | X | Ar | T | |
| 58 | | | | 4 |
| 59 | | | 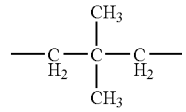 | 4 |
| 60 | | | —CH$_2$CH$_2$— | 4 |
| 61 | | | —CH$_2$CH$_2$— | 4 |
| Compound | A | | Y | Z | m | p |
|---|---|---|---|---|---|---|
| | k | n | | | | |
| 58 | 1 | 1 | —CH$_2$CH$_2$— | — | 1 | 100 |
| 59 | 1 | 1 | —CH$_2$CH$_2$— | | 1 | 85 |
| 60 | 1 | 1 | | — | 1 | 75 |
| 61 | 1 | 1 | —CH$_2$CH$_2$— | — | 1 | 85 |
TABLE 11
| Compound | A | | | T | BP | k | n |
|---|---|---|---|---|---|---|---|
| | X | Ar | | | | | |
| 62 | 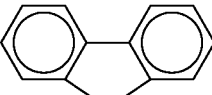 | 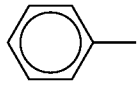 | | —CH$_2$CH$_2$— | 4 | 1 | 1 |
| 63 | 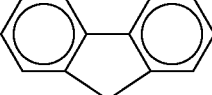 | 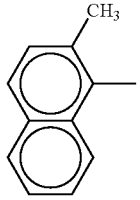 | | —CH$_2$— | 4 | 1 | 1 |
| 64 | 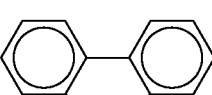 | 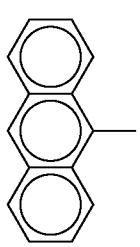 | | —CH$_2$CH$_2$— | 4 | 1 | 1 |
| 65 | 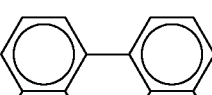 | 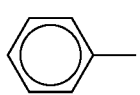 | | —CH$_2$CH$_2$— | 3 | 1 | 1 |

TABLE 11-continued
| | | | | | | |
|---|---|---|---|---|---|---|
| 66 | 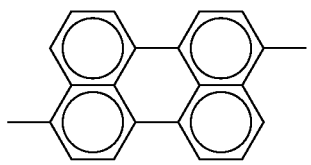 | 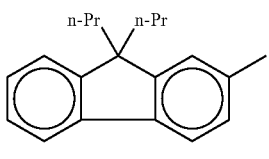 | —CH$_2$CH$_2$— | 4 | 1 | 1 |
| 67 | 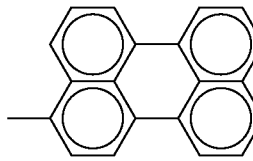 | 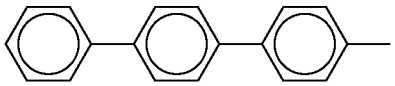 | —CH$_2$CH$_2$— | 4 | 1 | 1 |
| Compound | Y | Z | m | p |
|---|---|---|---|---|
| 62 | 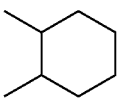 | — | 1 | 100 |
| 63 |  | 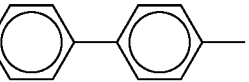 | 1 | 113 |
| 64 | —CH$_2$CH$_2$— | — | 1 | 113 |
| 65 | —CH$_2$CH$_2$— | — | 1 | 127 |
| 66 | —CH$_2$CH$_2$— |  | 1 | 115 |
| 67 | —CH$_2$CH$_2$— | — | 1 | 164 |
TABLE 12
| | A | | | | | |
|---|---|---|---|---|---|---|
| Compound | X | Ar | T | BP | k | n |
| 68 | 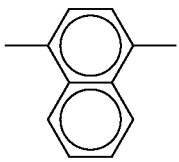 | 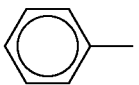 | — | 4 | 1 | 0 |
| 69 | 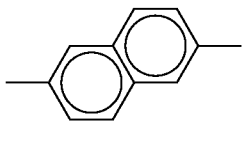 | 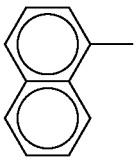 | — | 4 | 1 | 0 |

TABLE 12-continued

| Compound | Y | Z | m | p |
|---|---|---|---|---|
| 68 | —CH₂CH₂— | — | 1 | 65 |
| 69 | (cyclohexane-CH₂ linker) | biphenyl | 1 | 95 |
| 70 | —CH₂CH₂— | — | 1 | 87 |
| 71 | (cyclohexane) | — | 1 | 45 |
| 72 | —CH₂CH₂— | phenyl | 1 | 150 |

When the diamine compound polymer having the condensed aromatic group with the number described in the column "compound" in Tables 1 to 12 is cited in the descriptions hereinafter, it is described, for example, as "polymer (5)" with respect to the fifth compound.

Synthesis Method

While the method for synthesizing the diamine compound polymer having condensed aromatic groups of the invention is not particularly restricted, the method comprises, for example, the step of synthesizing a diarylamine by allowing an arylamine to react with a halogenated carboalkoxyalkylbenzene or halogenated carboalkoxybenzene followed by allowing this diarylamine to react with bishalogenated benzidine; or allowing an arylamine or diarylbenzene to react with halogenated carboalkoxyalkylbenzene or halogenated carboalkoxybenzene.

JP-A No. 5-80550 discloses a method for synthesizing a charge transport material having an alkylenecarboxylic acid ester group comprising the steps of forming a Grignard reagent with Mg after introducing a chloromethyl group, and esterifying the product after converting it into a carboxylic acid with carbon dioxide.

However, the chloromethyl group cannot be introduced into the starting material at an early stage of the reaction since the chloromethyl group is highly reactive. Accordingly, the methyl group introduced into the starting material at the early stage of the reaction is converted into a chloromethyl group after forming a triarylamine skeleton or tetraarylbenzidine skeleton; or a non-substituted material is used as a starting material, and a functional group such as a formyl group introduced by a substitution reaction of an aromatic ring is reduced to an alcohol after forming a tetraarylbenzidine skeleton, followed by converting into a chloromethyl group using a halogenating reagent such as thionyl chloride, or directly converting into the chloromethyl group using paraformaldehyde, hydrochloric acid and the like.

However, since the charge transport material having a triarylamine skeleton or a tetraarylbenzidine skeleton is highly reactive, the halogen is readily substituted to the aromatic ring when the introduced methyl group is converted into the chloromethyl group. Therefore, it is practically impossible to selectively chlorinate the methyl group.

The chloromethyl group can be introduced only to a para-position relative to the nitrogen atom by the method for converting into the chloromethyl group after introducing the functional group such as the formyl group, or by a direct chloromethylation method, using a non-substituted material as a starting material. Accordingly, the alkylenecarboxylic acid ester group can be only introduced into the para-position. The method for converting into the chloromethyl group after introducing the formyl group requires a long reaction time.

On the other hand, the method for obtaining monomers by allowing arylamine or diarylbenzidine to react with halogenated carboalkoxyalkylbenzene is excellent in changing the position of the substituent for readily controlling ionization potential. This method enables the properties of the diamine compound polymer having condensed aromatic groups to be controlled. Since the monomer used for synthesizing the diamine compound polymer having condensed aromatic groups of the invention is able to readily accept various substituents at arbitrary positions while it is stable, the monomer can be readily handled to enable the problems above to be solved.

The diamine compound polymer having condensed aromatic groups of the invention is synthesized by polymerizing the monomer represented by the following structural formula (VII-1) by a method known in the art such as those described in *Handbook of Experimental Chemistry* $4^{th}$ edition, vol. 28.

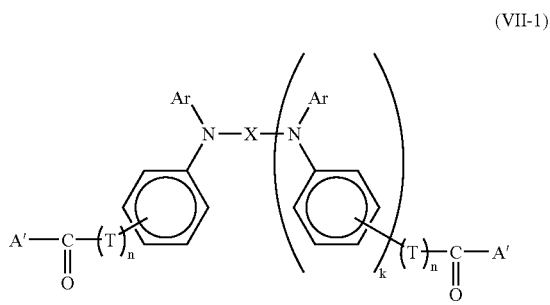

(VII-1)

In the structural formula (VII-1), Ar, X, T, k and n, respectively, are the same as Ar, X, T, k and n in the structural formula (II-1) described above. A' denotes a hydroxyl group, a halogen atom or a group represented by —O—$R_4$, wherein $R_4$ represents an alkyl group, or a substituted or non-substituted aryl or aralkyl group.

The diamine compound polymer having condensed aromatic groups represented by the formula (I-1) and (I-2) is synthesized as follows.

(1) When A' is a Hydroxyl Group

Divalent alcohols represented by HO—(Y—O)m-H are mixed in an approximately equal equivalent to the monomer, and are polymerized using an acid catalyst. The acid catalyst available include sulfuric acid, toluenesufonic acid and trifluoroacetic acid that can be used for usual esterification reactions. The acid catalyst is used in a range of 1/10000 to 1/10 part by weight, preferably 1/1000 to 1/50 part by weight, relative to 1 part by weight of the monomer. Solvents capable of azeotropic distillation together with water is preferably used for removing water formed during the synthesis, and toluene, chlorobenzene and 1-chloronaphthalene are effective. The solvent is used in a range of 1 to 100 parts by weight, preferably 2 to 50 parts by weight, relative to 1 part by weight of the monomer.

While the reaction temperature may be arbitrarily determined, it is preferable to react at the boiling point of the solvent in order to remove water formed during the polymerization. The reaction product is dissolved into a solvent capable of dissolving the reaction product after the reaction when no solvent is used. When a solvent is used, the reaction product is directly added dropwise into a poor solvent that hardly dissolves the polymer such as alcohols such as methanol and ethanol and acetone, therefore the polymer is precipitated. The polymer obtained is dried after thoroughly washing with water or organic solvents. Otherwise, re-precipitation treatments are repeated by dissolving the polymer in an appropriate organic solvent followed by adding in a poor solvent for precipitating the polymer. It is preferable to efficiently stirred the solvent with a mechanical stirrer for re-precipitation.

The solvent for dissolving the polymer for re-precipitation is used in a range of 1 to 100 parts by weight, preferably 2 to 50 parts by weight, relative to 1 part by weight of the polymer. The poor solvent is used in a range of 1 to 1000 parts by weight, preferably in a range of 10 to 500 parts by weight, relative to 1 part by weight of the polymer.

(2) When A' is a Halogen

Divalent alcohols represented by HO—(Y—O)m-H are mixed in an approximately equal equivalent to the monomer, and are polymerized using an organic base catalyst such as pyridine and triethylamine. The organic base catalyst is used in a range of 1 to 10 equivalent, preferably 2 to 5 equivalent, relative to 1 part by weight of the monomer.

Methylene chloride, tetrahydrofuran (THF), toluene, chlorobenzene and 1-chloronaphthalene are effective as the solvent, which is used in a range of 1 to 100 parts by weight, preferably in a range of 2 to 50 parts by weight, relative to 1 part by weight of the monomer. The reaction temperature may be arbitrarily determined. The polymer obtained is purified by re-precipitation as described above. An interface polymerization method may be used when divalent alcohols such as bisphenol having a high acidity are used. After water and an equivalent of the base are added to and dissolved in the divalent alcohol, the divalent alcohol and an equivalent of the monomer are polymerized with vigorous stirring. Water is used in a range of 1 to 1000 parts by weight, preferably 2 to 500 parts by weight, relative to 1 part of the divalent alcohol.

Methylene chloride, dichloroethane, trichloroethane, toluene, chlorobenzene and 1-chloronaphthalene are effective as the solvent for dissolving the monomer. The reaction temperature may be arbitrarily determined, and a phase-transfer catalyst such as an ammonium salt and a sulfonium salt is effectively used for accelerating the reaction. The phase-transfer catalyst is used in a range of 0.1 to 10 parts by weight, preferably 0.2 to 5 parts by weight, relative to 1 part by weight of the monomer.

(3) When A' is —O—$R_4$

The polymer is synthesized by an ester exchange reaction by adding an excess amount of the divalent alcohol represented by HO—(Y—O)m-H and by heating using an inorganic acid such as sulfuric acid or phosphoric acid, titanium alkoxide, acetate or carbonate of calcium or cobalt, or zinc oxide as a catalyst.

The divalent alcohol is used in a range of 2 to 100 equivalent, preferably 3 to 50 equivalent relative to 1 equivalent of the monomer. The catalyst is used in a range of 1/1000 to 1 part by weight, preferably 1/100 to 1/2 part by weight relative to 1 equivalent of the monomer.

The reaction is performed at a reaction temperature of 200 to 300° C., and the reaction is preferably proceeded under a reduced pressure after completing an ester exchange reaction from the —O—R$_4$ group to the —O—(Y—O—)m-H group in order to accelerate the polymerization reaction by elimination of the HO—(Y—O)m-H group. The reaction may be proceeded by removing the HO—(Y—O—)m-H group by azeotropic distillation using a high boiling point solvent such as 1-chloronaphthalene capable of azeotropic distillation with the HO—(Y—O—)m-H group under a reduced pressure.

The polymer represented by the formulae (I-1) and (I-2) may be also synthesized as follows. The polymer can be obtained by forming the compound represented by the structural formula (VIII-1) below by allowing the monomer to react by adding an excess amount of the divalent alcohol in each case described above, followed by allowing the compound represented by the structural formula (VIII-1) below as a monomer to react with a divalent carboxylic acid or divalent carboxylic acid halide by the same method as described in above (2).

can be made to be readily compatible with chemical stability by controlling the molecular structure.

Consequently, the properties may be readily optimized depending on the application fields when the diamine compound polymer having condensed aromatic groups of the invention is applied to various organic electronic devices. In addition, since the polymer has a margin for selecting mobility and quantum efficiency to be a relatively high level as compared with the conventional charge transport materials, a high performance organic electronic device can be manufactured. Furthermore, since the diamine compound polymer having condensed aromatic groups of the invention has a higher glass transition temperature with an excellent heat stability as compared with conventional low molecular charge transport materials, the polymer of the invention can be favorably used in the application field requiring high heat resistance.

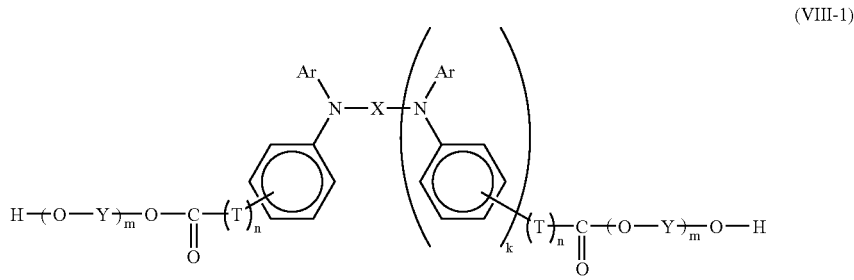

(VIII-1)

Ar, X, T, k and n in the structural formula (VIII-1), respectively, are the same as Ar, X, T, k and n in the formula (II-1). Y represents a divalent hydrocarbon group, and m represents an integer from 1 to 5.

Synthesis of the diamine compound polymer having condensed aromatic groups of the invention is easy with a high reaction yield.

Physical Properties

The diamine compound polymer having condensed aromatic groups of the invention can be synthesized by taking advantage of the synthesis methods as described above with a controlled molecular structure and molecular weight. While the properties of the diamine compound polymer having condensed aromatic groups of the invention are not uniquely defined, the properties may be readily controlled within a desired range such as a mobility of $10^{-7}$ to $10^{-4}$ cm$^2$/Vs, a quantum efficiency of about 0.1 to 0.5, and a glass transition temperature of 75 to 200° C. by controlling the molecular structure and molecular weight in the synthesis.

While it may be required for manufacturing an organic electronic device to use the diamine compound polymer having condensed aromatic groups of the invention by dissolving in a solvent or by mixing with other materials such as resins, the polymer may be synthesized by controlling the molecular structure and molecular weight considering solubility in the solvent or compatibility with the resin. Accordingly, the diamine compound polymer having condensed aromatic groups of the invention can be utilized as a solution dissolved in a solvent together with other resin materials, if necessary, for manufacturing the organic electronic device, and the production cost may be reduced by using a liquid phase film forming method. Heat resistance

EXAMPLES

Examples of the present invention will be described hereinafter with reference to examples. The synthetic procedures of the monomers necessary for synthesizing the diamine compound polymer having condensed aromatic groups of the invention are described in the Synthesis Examples 1 to 6, and examples of synthesis of the diamine compound polymer having condensed aromatic groups of the invention are described thereafter in Examples 1 to 6.

Synthesis Example 1

Synthesis of N,N'-diphenyl-N,N'-bis [4-(2-mehtoxy-carbonylethyl)phenyl]-naphthyl-1,4-diamine 10.0 g of N-phenyl-N-[4-(2-mehtoxycarbonylethyl)phenyl]amine, 5.1 g of 1,4-dibromonaphthalene, 6.2 g of potassium carbonate, 0.5 g of copper sulfate pentahydrate and 20 ml of n-tridecane are put into a 100 ml three-necked flask, and the mixture is stirred with heating at 230° C. for 33 hours in a nitrogen stream. After the reaction, the reaction solution is cooled to room temperature, and 100 ml of toluene is added to the solution for dissolving the reaction product. Impurities are filtered off with celite, and the filtrate is subjected to silica gel chromatography using toluene as an eluate for purification to obtain N,N'-bisphenyl-N,N'-bis[4-(2-mehtoxycarbonylethyl)phenyl]-naphthyl-1,4-diamine.

The melting point of this compound is 139 to 141° C. An IR spectrum of this compound is shown in FIG. 1. In FIG. 1, the vertical axis shows the wavelength, and the horizontal axis shows the transmittance. These are the same as in other IR spectra shown below.

Synthesis Example 2

Synthesis of N,N'-diphenyl-N,N'-bis[4-(2-methoxy-carbonylethyl)phenyl]-anthracenyl-9,10-diamine 15.0 g of N-phenyl-N-[4-(2-mehtoxycarbonylethyl)phenyl]amine, 8.2 g of 9,10-dibromoanthracene, 5.5 g of potassium carbonate, 0.5 g of copper sulfate pentahydrate and 40 ml of o-dichlorobenzene are put into a 200 ml three-necked flask, and the mixture is stirred with heating at 180° C. for 24 hours in a nitrogen stream. After the reaction, the reaction solution is cooled to room temperature, and 100 ml of toluene is added to the solution for dissolving the reaction product. Impurities are filtered off with celite, and the filtrate is subjected to silica gel chromatography using toluene as an eluate for purification to obtain N,N'-diphenyl-N,N'-bis[4-(2-methoxycarbonylethyl)phenyl]-anthracenyl-9,10-diamine.

Figure 2:
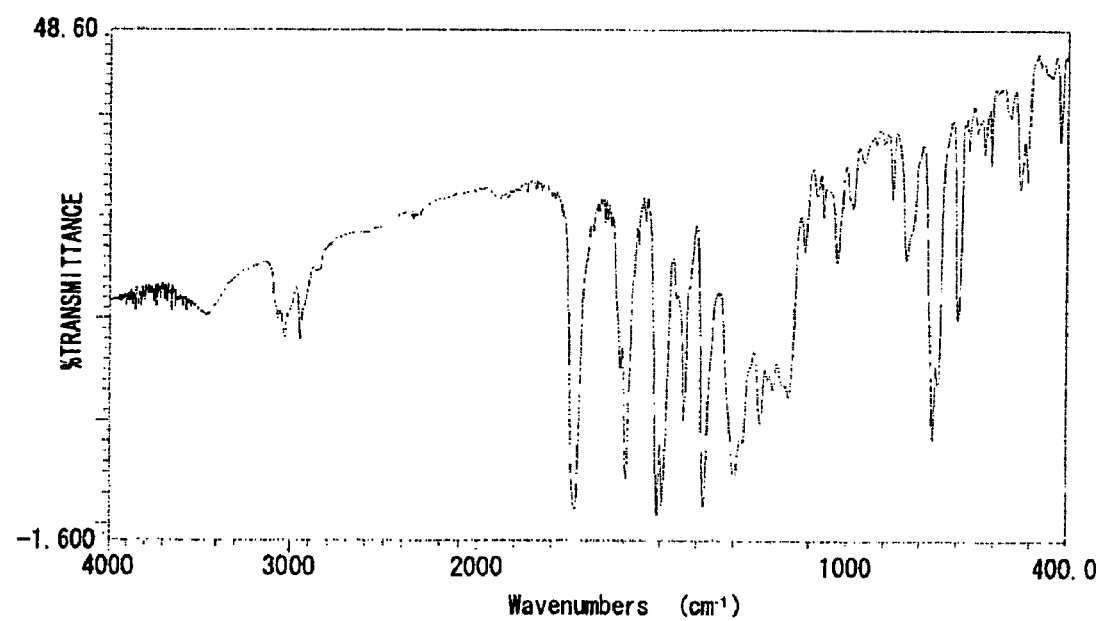
FIG. 2 is an IR spectrum of the amine compound in synthetic example 2.

The melting point of this compound is 135 to 136° C. The IR spectrum of this compound is shown in FIG. 2.

Synthesis Example 3

Synthesis of N,N'-diphenyl-N,N'-bis[4-(2-methoxy-carbonylethyl)phenyl]-naphthyl-2,6-diamine 22.3 g of N-phenyl-N-[4-(2-mehtoxycarbonylethyl)phenyl]amine, 9.5 g of 2,6 -dibromoanthracene, 12.0 g of potassium carbonate, 0.9 g of copper sulfate pentahydrate and 30 ml of o-dichlorobenzene are put into a 200 ml three-necked flask, and the mixture is stirred with heating at 180° C. for 30 hours in a nitrogen stream. After the reaction, the reaction solution is cooled to room temperature, and 150 ml of toluene is added to the solution for dissolving the reaction product. Impurities are filtered off with celite, and the filtrate is subjected to silica gel chromatography using toluene as an eluate for purification to obtain N,N'-diphenyl-N,N'-bis[4-(2-methoxycarbonylethyl)phenyl]-naphthyl-2,6-diamine.

Figure 3:
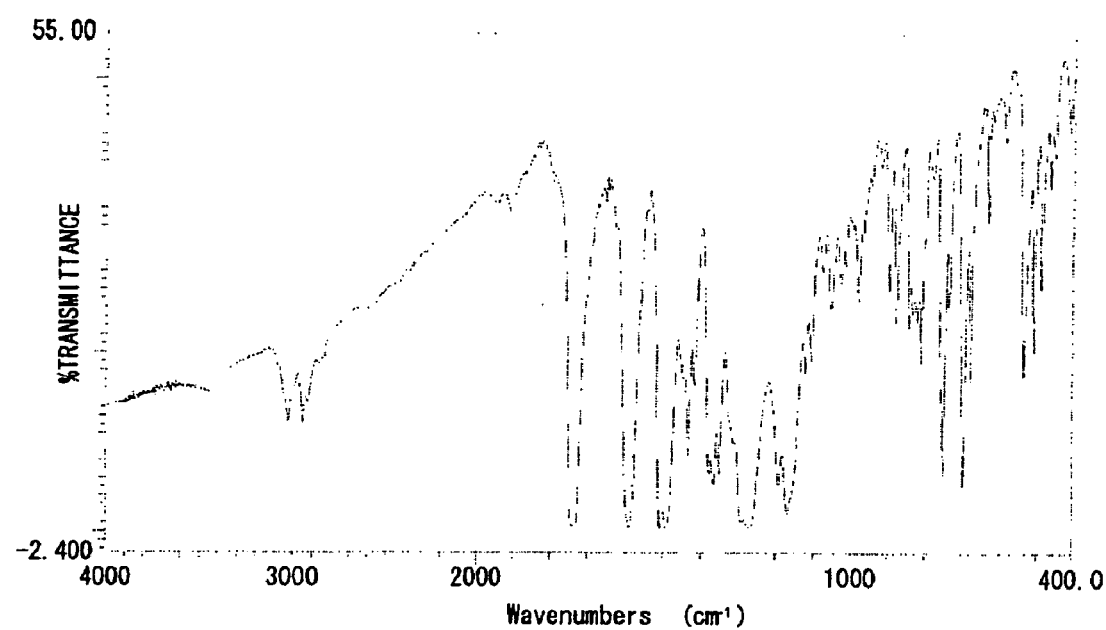
FIG. 3 is an IR spectrum of the amine compound in synthetic example 3.

The melting point of this compound is 154 to 156° C. The IR spectrum of this compound is shown in FIG. 3.

Synthesis Example 4

Synthesis of N,N'-diphenyl-N,N'-bis[4-(2-methoxyxarbonylethyl)phenyl-(9,9-dimethylfluorenyl)]-2,7-diamine 7.3 g of N-phenyl-N-[4-(2-mehtoxycarbonylethyl)phenyl]amine, 5.0 g of 2,7-dibromo-9,9-dimethylfluorene, 3.4 g of potassium carbonate, 0.3 g of copper sulfate pentahydrate and 30 ml of o-dichlorobenzene are put into a 100 ml three-necked flask, and the mixture is stirred with heating at 180° C. for 23 hours in a nitrogen stream. After the reaction, the reaction solution is cooled to room temperature, and 100 ml of toluene is added to the solution for dissolving the reaction product. Impurities are filtered off with celite, and the filtrate is subjected to silica gel chromatography using toluene as an eluate for purification to obtain N,N'-diphenyl-N,N'-bis[4-(2-methoxyxarbonylethyl)phenyl-(9,9-dimethylfluorenyl)]-2,7-diamine.

Figure 4:
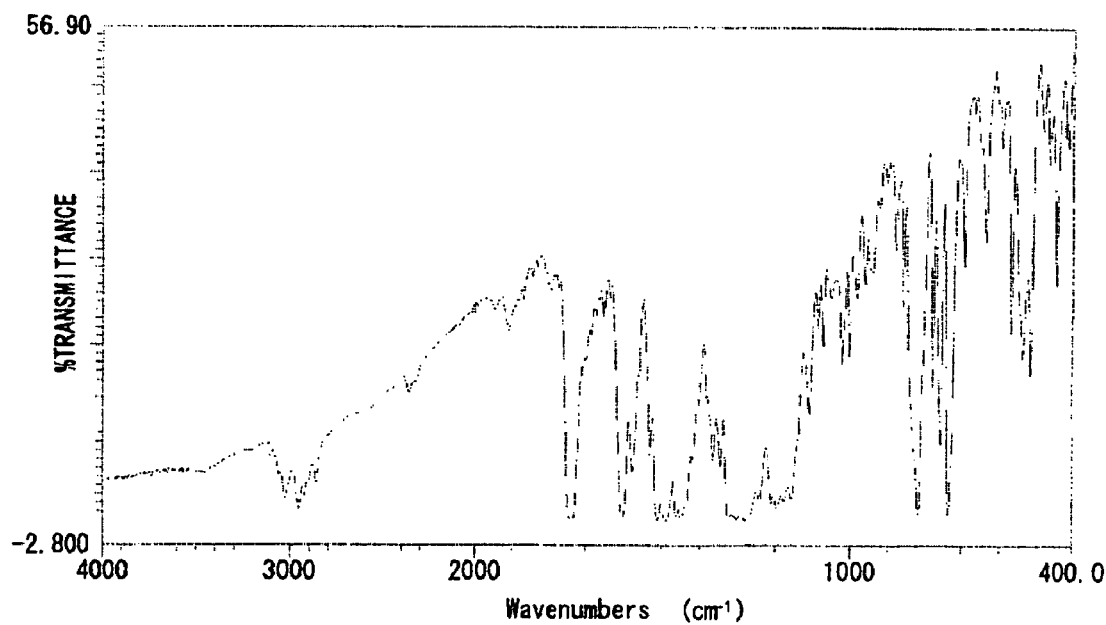
FIG. 4 is an IR spectrum of the amine compound in synthetic example 4.

The melting point of this compound is 159 to 161° C. The IR spectrum of this compound is shown in FIG. 4.

Synthesis Example 5

Figure 5:
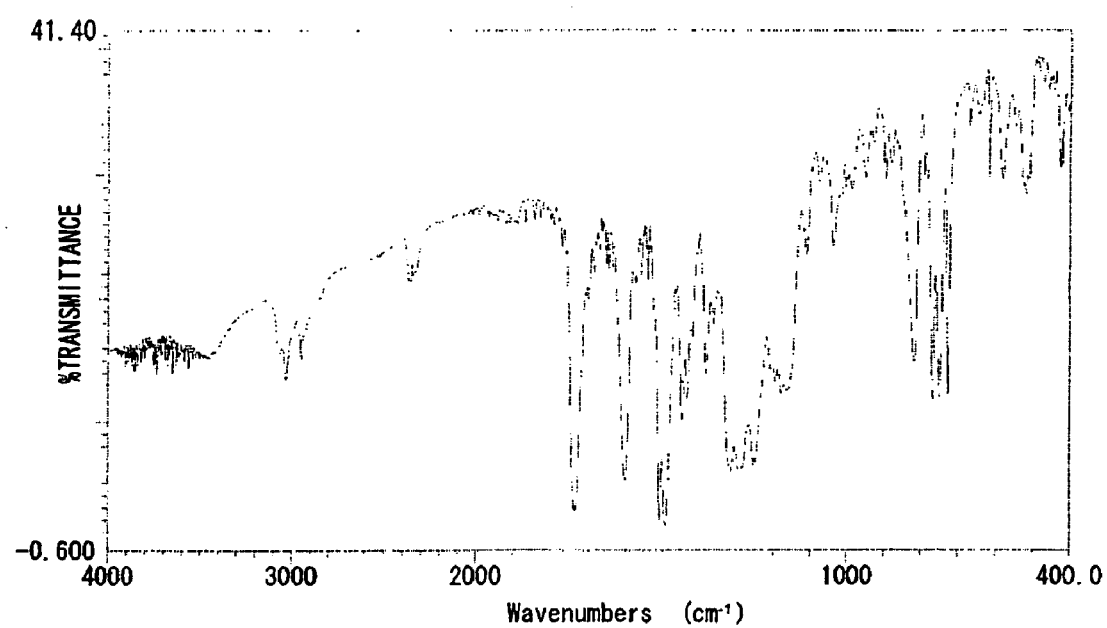
FIG. 5 is an IR spectrum of the amine compound in synthetic example 5.

Synthesis of N,N'-diphenyl-N,N'-bis[4-(2-methoxy-carbonylethyl)phenyl]-(9,9-dioctylfluorenyl)-2,7-diamine 15.4 g of N-phenyl-N-[4-(2-mehtoxycarbonylethyl)phenyl]amine, 15.0 g of 9,9-dioctyl-2,7-dibromofluorene, 8.4 g of potassium carbonate, 0.7 g of copper sulfate pentahydrate and 50 ml of n-tridecane are put into a 300 ml three-necked flask, and the mixture is stirred with heating at 230° C. for 40 hours in a nitrogen stream. After the reaction, the reaction solution is cooled to room temperature, and 200 ml of toluene is added to the solution for dissolving the reaction product. Impurities are filtered off with celite, and the filtrate is subjected to silica gel chromatography using toluene as an eluate for purification to obtain N,N'-diphenyl-N,N'-bis[4-(2-methoxycarbonylethyl)phenyl]-(9,9-doctylfluorenyl)-2,7-diamine. The IR spectrum of this compound is shown in FIG. 5.

Synthesis Example 6

Synthesis of N,N'-diphenyl-N,N'-bis[4-(2-methoxy-carbonylethyl)phenyl]-(9,9-dipropylfluorenyl)-2,7-diamine 8.5 g of N-phenyl-N-[4-(2 -mehtoxycarbonylethyl)phenyl]amine, 4.4 g of 9,9-di-n-propyl-2,7-dibromofluorene, 3.8 g of potassium carbonate, 0.3 g of copper sulfate pentahydrate and 30 ml of n-tridecane are put into a 100 ml three-necked flask, and the mixture is stirred with heating at 230° C. for 15 hours in a nitrogen stream. After the reaction, the reaction solution is cooled to room temperature, and 100 ml of toluene is added to the solution for dissolving the reaction product. Impurities are filtered off with celite, and the filtrate is subjected to silica gel chromatography using toluene as an eluate for purification to obtain N,N'-diphenyl-N,N'-bis[4-(2-methoxycarbonylethyl)phenyl]-(9,9'-dipropylfluorenyl)-2,7-diamine.

Figure 6:
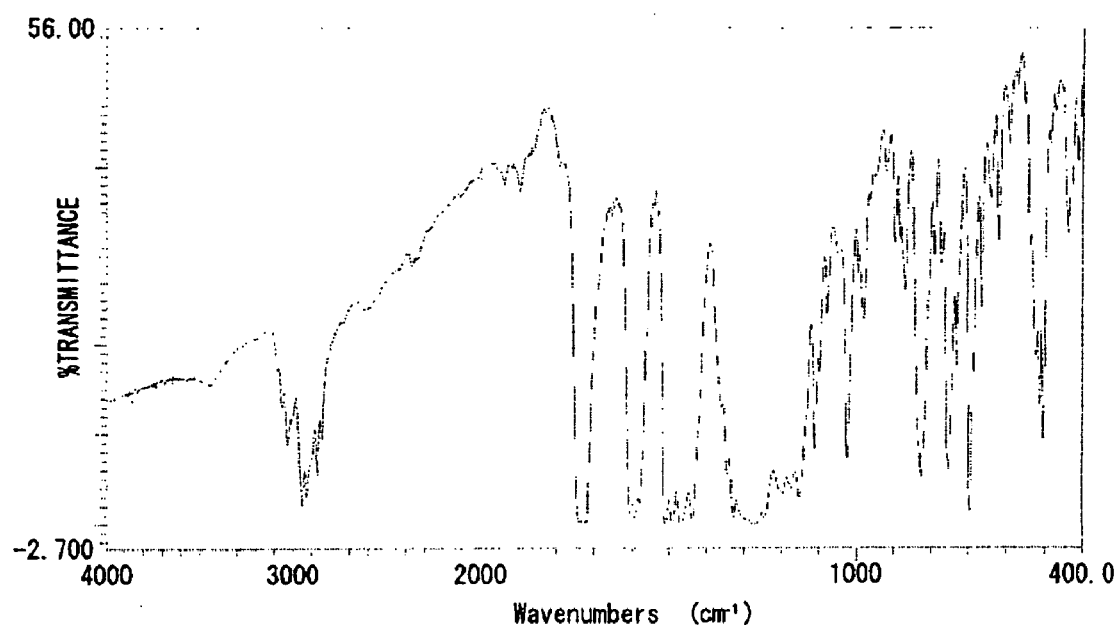
FIG. 6 is an IR spectrum of the amine compound in synthetic example 6.

The melting point is 143 to 144° C. The IR spectrum of this compound is shown in FIG. 6.

Example 1

Synthesis of Polymer (17)

1.0 g of N,N'-diphenyl-N,N'-bis[4-(2-methoxycarbonyleyhyl)phenyl]-naphthyl-1,4-diamine, 3.0 g of ethyleneglycol and 0.04 g of tetrabutoxytitanium are put into a 50 ml three-necked flask, and the solution is stirred with heating at 200° C. for 3 hours in a nitrogen stream. After confirming that N,N'-diphenyl-N,N'-bis[4-(2-methoxycarbonyleyhyl)phenyl]-naphthyl-1,4-diamine has been consumed, the reaction is continued for 4 hours with heating at 230° C. while ethyleneglycol is removed by distillation under a reduced pressure of 0.5 mmHg.

Figure 7:
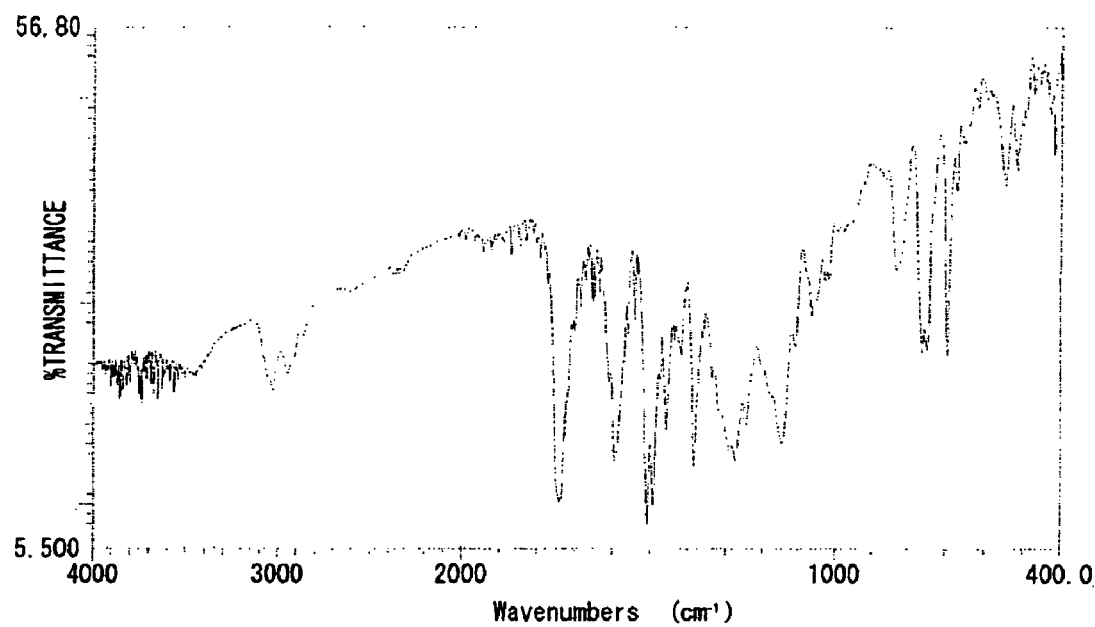
FIG. 7 is an IR spectrum of the polymer (25) in Example 1.

The reaction solution is cooled to room temperature thereafter, and 50 ml of toluene is added to dissolve the product. Impurities are filtered off with a polytetrafluoroethylene (PTFE) filter with a pore size of 0.5 μm. The filtrate is added dropwise into 500 ml of methanol with stirring to precipitate the polymer. The polymer obtained is filtered off, thoroughly washed with methanol and dried to obtain 1.0 g of polymer (17). The weight average molecular weight Mw is found to be $9.2 \times 10^4$ (as converted into styrene) from the measurement by GPC, and the degree of polymerization (p)

is about 145 as determined from the molecular weight of the monomer. The IR spectrum of this compound is shown in FIG. 7.

Example 2

Synthesis of Polymer (26)

1.0 g of N,N'-diphenyl-N,N'-bis[4-(2-methoxycarbonyleyhyl)phenyl]-anthracenyl-9,10-diamine, 3.0 g of ethyleneglycol and 0.04 g of tetrabutoxytitanium are put into a 50 ml three-necked flask, and the solution is stirred with heating at 200° C. for 3.5 hours in a nitrogen stream. After confirming that N,N'-diphenyl-N,N'-bis[4-(2-methoxycarbonyleyhyl)phenyl]-anthracenyl-9,10-diamine has been consumed, the reaction is continued for 3.5 hours with heating at 200° C. while ethyleneglycol is removed by distillation under a reduced pressure of 0.5 mmHg.

Figure 8:
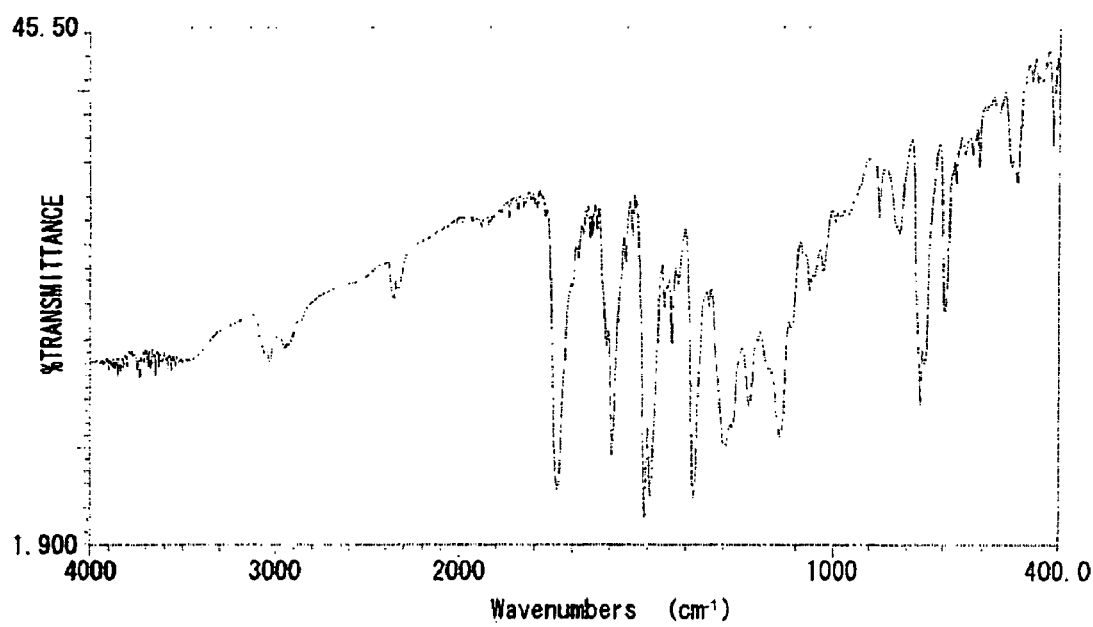
FIG. 8 is an IR spectrum of the polymer (34) in Example 2.

The reaction solution is cooled to room temperature thereafter, and 50 ml of toluene is added to dissolve the product. Impurities are filtered off with a PTFE filter with a pore size of 0.5 μm. The filtrate is added dropwise into 500 ml of methanol with stirring to precipitate the polymer. The polymer obtained is filtered off, thoroughly washed with methanol and dried to obtain 1.0 g of polymer (26). The weight average molecular weight Mw is found to be $3.3 \times 10^4$ (as converted into styrene) from the measurement by GPC, and the degree of polymerization (p) is about 48 as determined from the molecular weight of the monomer. The IR spectrum of this compound is shown in FIG. 8.

Example 3

Synthesis of Polymer (21)

0.8 g of N,N'-diphenyl-N,N'-bis[4-(2-methoxycarbonyleyhyl)phenyl]-naphthyl-2,6-diamine, 4.0 g of ethyleneglycol and 0.04 g of tetrabutoxytitanium are put into a 50 ml three-necked flask, and the solution is stirred with heating at 200° C. for 4.5 hours in a nitrogen stream. After confirming that N,N'-diphenyl-N,N'-bis[4-(2-methoxycarbonyleyhyl) phenyl]-anthracenyl-2,6-diamine has been consumed, the reaction is continued for 4 hours with heating at 230° C. while ethyleneglycol is removed by distillation under a reduced pressure of 0.5 mmHg.

Figure 9:
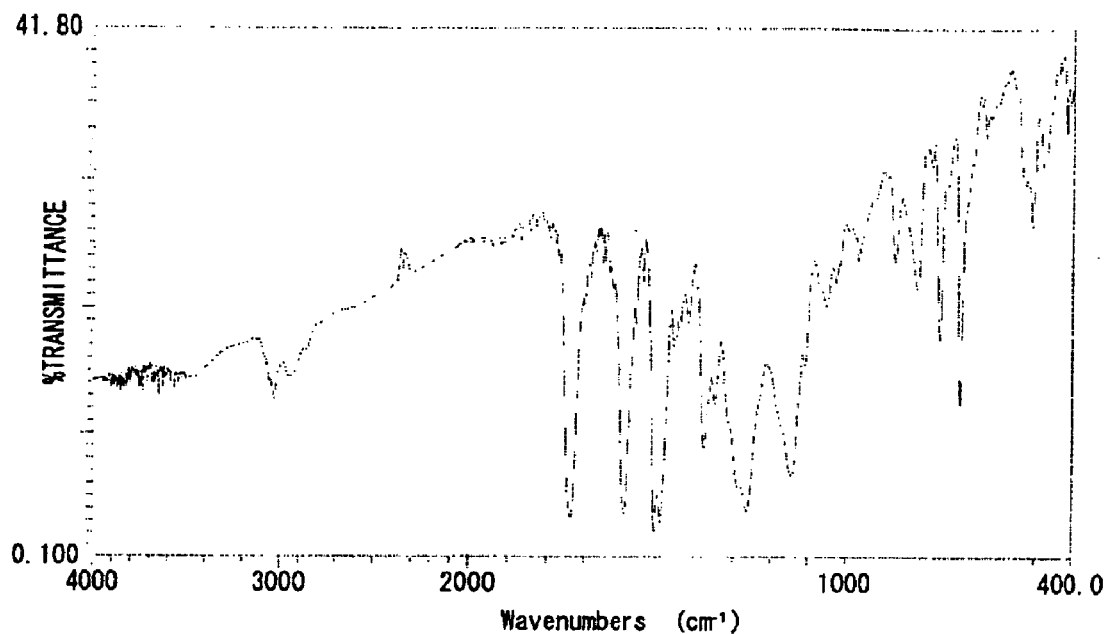
FIG. 9 is an IR spectrum of the polymer (36) in Example 3.

The reaction solution is cooled to room temperature thereafter, and 50 ml of toluene is added to dissolve the product. Impurities are filtered off with a PTFE filter with a pore size of 0.5 μm. The filtrate is added dropwise into 400 ml of methanol with stirring to precipitate the polymer. The polymer obtained is filtered off, thoroughly washed with methanol and dried to obtain 0.6 g of polymer (21). The weight average molecular weight Mw is found to be $1.1 \times 10^5$ (as converted into styrene) from the measurement by GPC, and the degree of polymerization (p) is about 163 as determined from the molecular weight of the monomer. The IR spectrum of this compound is shown in FIG. 9.

Example 4

Synthesis of Polymer (33)

0.8 g of N,N'-diphenyl-N,N'-bis[4-(2-methoxycarbonyleyhyl)phenyl]-(9,9-dimethylfluorenyl)-2,7-diamine, 4.0 g of ethyleneglycol and 0.04 g of tetrabutoxytitanium are put into a 50 ml three-necked flask, and the solution is stirred with heating at 200° C. for 3 hours in a nitrogen stream. After confirming that N,N'-diphenyl-N,N'-bis[4-(2-methoxycarbonyleyhyl)phenyl]-(9,9-dimethylfluorenyl)-2,7-diamine has been consumed, the reaction is continued for 4 hours with heating at 230° C. while ethyleneglycol is removed by distillation under a reduced pressure of 0.5 mmHg.

Figure 10:
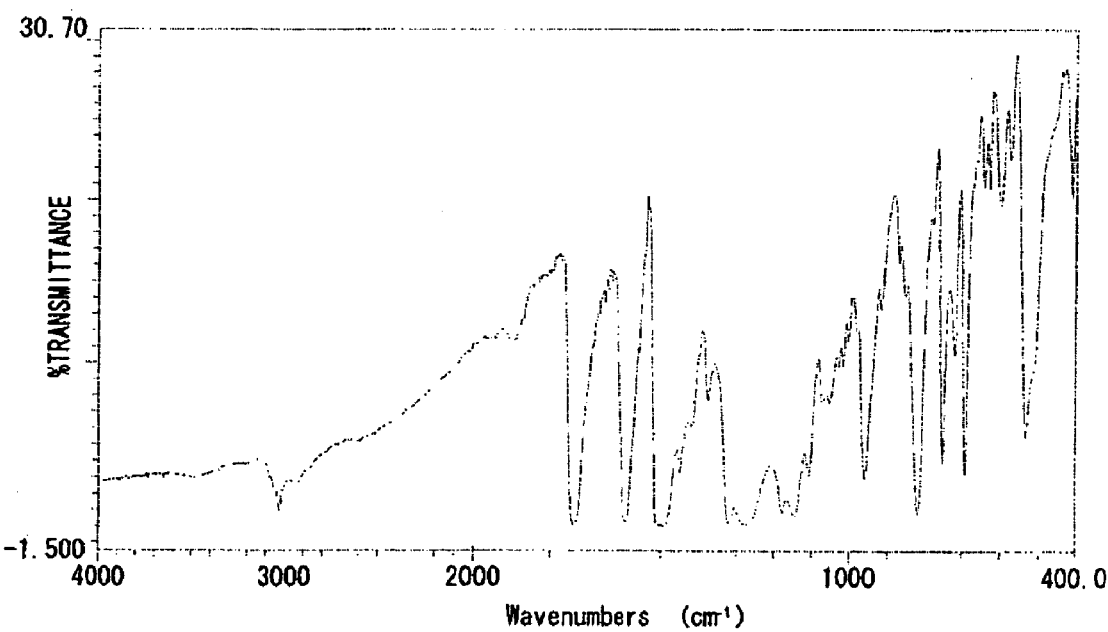
FIG. 10 is an IR spectrum of the polymer (41) in Example 4.

The reaction solution is cooled to room temperature thereafter, and 100 ml of monochlorobenzene is added to dissolve the product. Impurities are filtered off with a PTFE filter with a pore size of 0.5 μm. The filtrate is added dropwise into 400 ml of methanol with stirring to precipitate the polymer. The polymer obtained is filtered off, thoroughly washed with methanol and dried to obtain 0.6 g of polymer (33). The weight average molecular weight Mw is found to be $1.4 \times 10^5$ (as converted into styrene) from the measurement by GPC, and the degree of polymerization (p) is about 199 as determined from the molecular weight of the monomer. The IR spectrum of this compound is shown in FIG. 10.

Example 5

Synthesis of Polymer (39)

Figure 11:
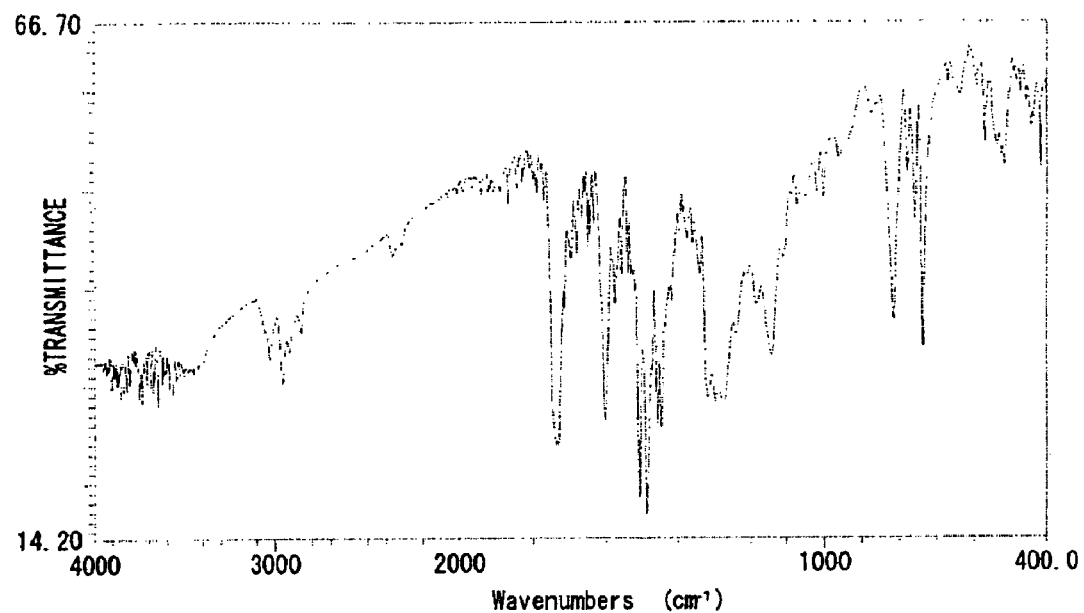
FIG. 11 is an IR spectrum of the polymer (47) in Example 5.

2.0 g of N,N'-diphenyl-N,N'-bis[4-(2-methoxycarbonyleyhyl)phenyl]-(9,9-dioctylfluorenyl)-2,7-diamine, 10 g of ethyleneglycol and 0.06 g of tetrabutoxytitanium are put into a 50 ml three-necked flask, and the solution is stirred with heating at 230° C. for 8 hours in a nitrogen stream. After confirming that N,N'-diphenyl-N,N'-bis[4-(2-methoxycarbonyleyhyl)phenyl]-(9,9-dioctylfluorenyl)-2,7-diamine has been consumed, the reaction is continued for 4 hours with heating at 230° C. while ethyleneglycol is removed by distillation under a reduced pressure of 0.5 mmHg. The reaction solution is cooled to room temperature thereafter, and 100 ml of monochlorobenzene is added to dissolve the product. Impurities are filtered off with a PTFE filter with a pore size of 0.5 μm. The filtrate is added dropwise into 1 L of methanol with stirring to precipitate the polymer. The polymer obtained is filtered off, thoroughly washed with methanol and dried to obtain 1.74 g of polymer (39). The weight average molecular weight Mw is found to be $3.5 \times 10^4$ (as converted into styrene) from the measurement by GPC, and the degree of polymerization (p) is about 40 as determined from the molecular weight of the monomer. The IR spectrum of this compound is shown in FIG. 11.

Example 6

Synthesis of Polymer (36)

1.0 g of N,N'-diphenyl-N,N'-bis[4-(2-methoxycarbonyleyhyl)phenyl]-(9,9-di-n-propylfluorenyl)-2,7-diamine, 5.0 g of ethyleneglycol and 0.04 g of tetrabutoxytitanium are put into a 50 ml three-necked flask, and the solution is stirred with heating at 200° C. for 4 hours in a nitrogen stream. After confirming that N,N'-diphenyl-N,N'-bis[4-(2-methoxycarbonyleyhyl)phenyl]-(9,9-di-n-propylfluorenyl)-2,7-diamine has been consumed, the reaction is continued for 4 hours with heating at 200° C. while ethyleneglycol is removed by distillation under a reduced pressure of 0.5 mmHg.

Figure 12:
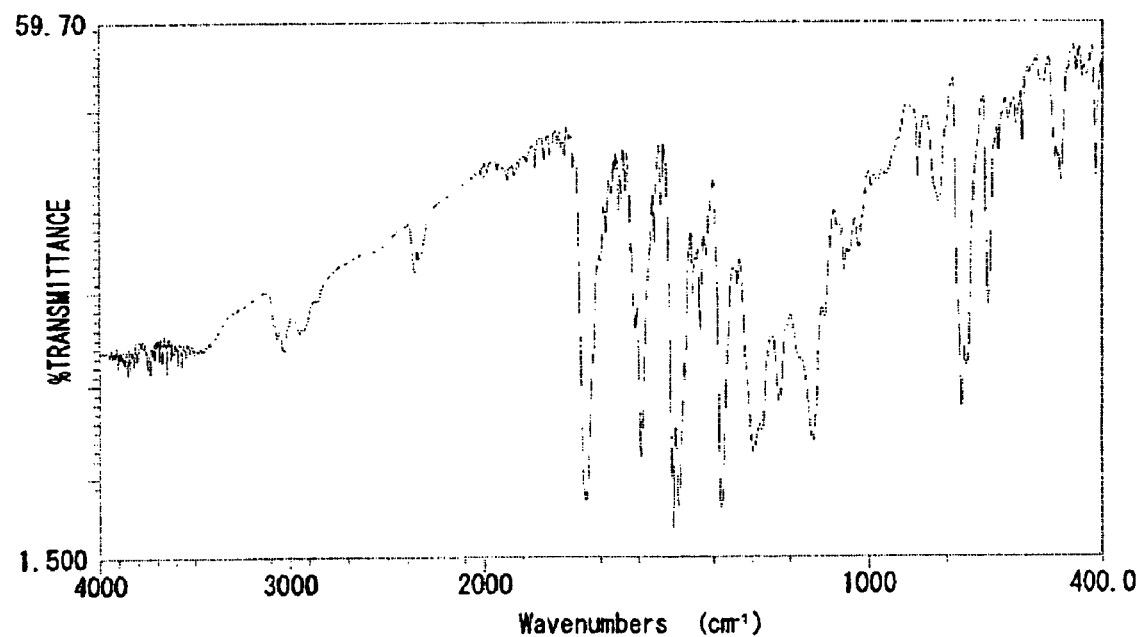
FIG. 12 is an IR spectrum of the polymer (44) in Example 6.

The reaction solution is cooled to room temperature thereafter, and 100 ml of monochlorobenzene is added to dissolve the product. Impurities are filtered off with a PTFE filter with a pore size of 0.5 μm. The filtrate is added dropwise into 500 ml of methanol with stirring to precipitate the polymer. The polymer obtained is filtered off, thoroughly washed with methanol and dried to obtain 0.9 g of polymer (36). The weight average molecular weight Mw is found to be $8.0 \times 10^4$ (as converted into styrene) from the measurement by GPC, and the degree of polymerization (p) is about 106 as determined from the molecular weight of the monomer. The IR spectrum of this compound is shown in FIG. 12.

The mobility of the diamine compound polymer having condensed aromatic groups of the invention is measured by a Time-of-flight method, the glass transition temperature is measured with a differential scanning calorimeter (DSC) (trade name: Tg/TDA 6200, manufactured by Seiko Instruments Inc.), and quantum efficiency as a thin film is measured according to the method of R. H. Friend et al. (*Chem. Phys. Lett.*, 241, 1995, p.89). The results are shown in Table 13.

TABLE 13

| | Mobility (cm²/V$_s$) | Quantum efficiency | Glass Transition Temperature (° C.) |
|---|---|---|---|
| Polymer in Example 1 | $8 \times 10^{-6}$ | $0.21 \pm 0.01$ | 113 |
| Polymer in Example 2 | $4 \times 10^{-7}$ | $0.21 \pm 0.01$ | 155 |
| Polymer in Example 3 | $3 \times 10^{-5}$ | $0.15 \pm 0.01$ | 116 |
| Polymer in Example 4 | $3 \times 10^{-7}$ | $0.19 \pm 0.01$ | 160 |
| Polymer in Example 5 | $1 \times 10^{-7}$ | $0.18 \pm 0.01$ | 117 |
| Polymer in Example 6 | $5 \times 10^{-7}$ | $0.18 \pm 0.01$ | 138 |
| Comparative Example 1 (MEH-PPV) | $10^{-8}$–$10^{-7}$ | $0.09 \pm 0.001$ | 75 |

The results in Table 13 shows that the diamine compound polymer having condensed aromatic groups of the invention has high mobility and light emitting characteristics as compared with the conventional charge transport materials, and the glass transition temperature thereof is as high as 100° C. or more. The properties of MEH-PPV [poly(2-methoxy-5-(2'-ethylhexyloxy)-1,4 -phenylenevinylene, weight average molecular weight Mw=86,000] as the conventional charge transport material are shown as Comparative Example 1 in Table 13.

According to the invention as described above, fundamental properties required for the charge transport material, or mobility, quantum efficiency, productivity, safety and handling performance are compatible in high level. The invention provides the diamine compound polymer comprising a condensed aromatic group applicable to various organic electronic devices.

What is claimed is:

1. A diamine compound polymer comprising a condensed aromatic group selected from the groups represented by the following formulae (I-1) and (I-2):

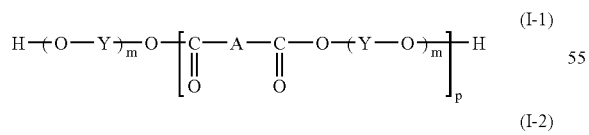

(I-1)

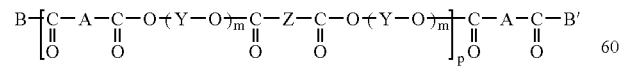

(I-2)

wherein A represents a structure represented by the following formula (II-1); Y and Z represent divalent hydrocarbon groups; B and B' each independently represents a group represented by —O—(Y—O)m-H or —O—(Y—O) m-CO-Z-CO—OR', wherein R' is a hydrogen atom, an aralkyl group, a substituted or non-substituted aryl group, or a substituted or non-substituted aralkyl group; m represents an integer from 1 to 5; and p represents an integer from 5 to 5000;

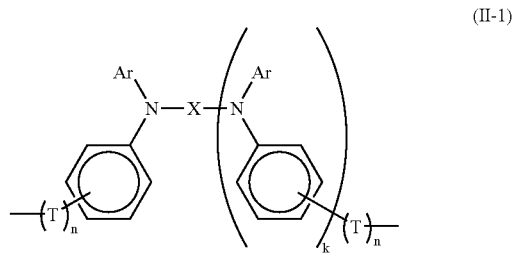

(II-1)

wherein Ar represents a substituted or non-substituted monovalent aromatic group; X is a divalent aromatic compound represented by the following structural formula (III-2);

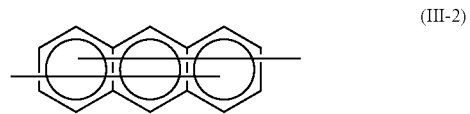

(III-2)

T represents a divalent linear hydrocarbon group having 1 to 6 carbon atoms or a divalent branched hydrocarbon group having 2 to 10 carbon atoms; and k and n each represents an integer of 0 or 1.

2. A diamine compound polymer according to claim 1, wherein X in the formula (II-1) is a divalent aromatic compound represented by the structural formula (III-2), and X is bonded to the nitrogen atoms in the formula (II-1) at positions 9 and 10 in the formula (III-2).

3. A diamine compound polymer according to claim 1, wherein Y and Z are independently selected from the group consisting of the following formulae (V-1) to (V-7):

—(CH$_2$)$_d$— (V-1)

—(CH$_2$CH$_2$O)$_e$—(CH$_2$CH$_2$)— (V-2)

(V-3)

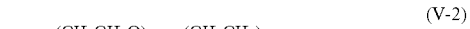

(V-4)

(V-5)

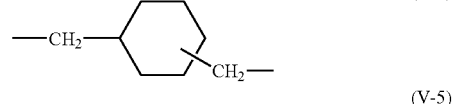

(V-6)

-continued (V-7)

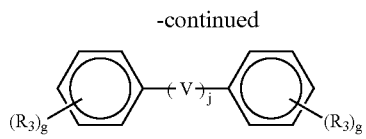

wherein $R_2$ and $R_3$ each represents a hydrogen atom, an alkyl group having 1 to 4 carbon atoms, an alkoxy group having 1 to 4 carbon atoms, a substituted or non-substituted phenyl group, a substituted or non-substituted aralkyl group, or a halogen atom; d and e each represents an integer from 1 to 10; f and g each represents an integer of 0, 1 or 2; h and i each represents an integer of 0 or 1; and V represents a group selected from the following formulae (VI-1) to (VI-10);

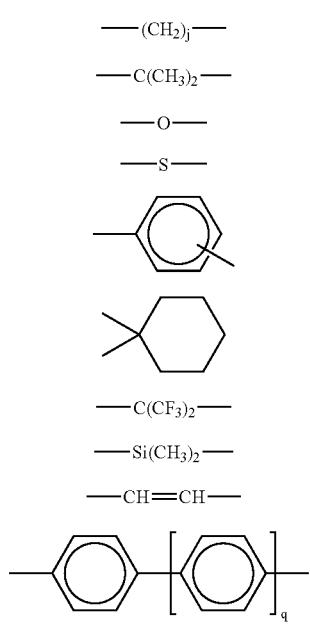

(VI-1)
(VI-2)
(VI-3)
(VI-4)
(VI-5)
(VI-6)
(VI-7)
(VI-8)
(VI-9)
(VI-10)

wherein j represents an integer from 1 to 10; and q represents an integer from 1 to 3.

4. A diamine compound polymer according to claim 1, wherein Ar represents a substituted or non-substituted monovalent aromatic group containing 1 to 10 aromatic rings.

5. A diamine compound polymer according to claim 1, wherein T represents a divalent linear hydrocarbon group having 2 to 6 carbon atoms or a divalent branched hydrocarbon group having 3 to 7 carbon atoms.

6. A method for producing a diamine compound polymer having a condensed aromatic group selected from the groups represented by the following formulae (I-1) and (1-2), the method comprising the step of polymerizing monomers represented by the following formula (VII-1):

(I-1)

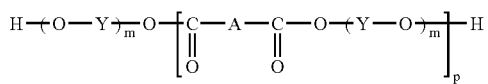

(I-2)

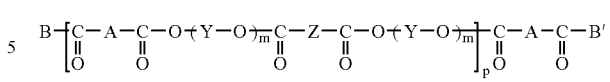

wherein A represents a structure represented by the following formula (II-1); Y and Z represent divalent hydrocarbon groups; B and B' each independently represents a group represented by —O—(Y—O)m-H or —O—(Y—O)m-CO-Z-CO—OR', wherein R' is a hydrogen atom, an aralkyl group, a substituted or non-substituted aryl group, or a substituted or non-substituted aralkyl group; m represents an integer from 1 to 5; and p represents an integer from 5 to 5000;

(II-1)

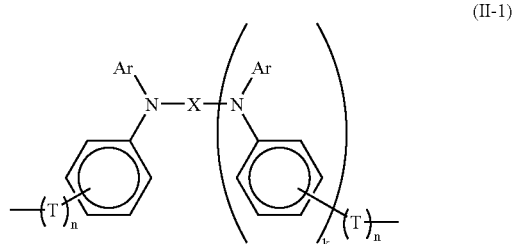

(VII-1)

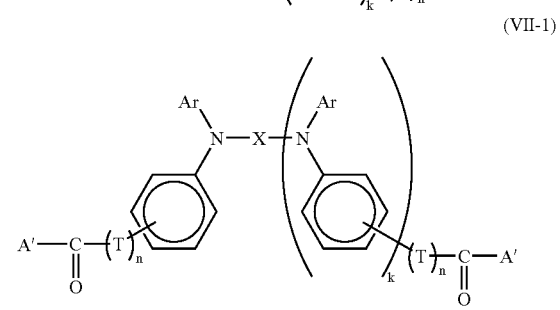

wherein Ar represents a substituted or non-substituted monovalent aromatic group; X is a divalent aromatic compound represented by the following structural formula (III-2);

(III-2)

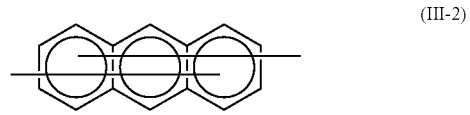

T represents a divalent linear hydrocarbon group having 1 to 6 carbon atoms or a divalent branched hydrocarbon group having 2 to 10 carbon atoms; and k and n each represents an integer of 0 or 1; and A' represents a hydroxyl group, a halogen atom or a group represented by -O-$R_4$, wherein $R_4$ is an alkyl group, a substituted or non-substituted aryl group or an aralkyl group.

7. A method for producing a diamine compound polymer including a condensed aromatic group selected from the groups represented by the following formula (I-1) or (I-2), the method comprising the step of polymerizing a monomer represented by the following formula (VIII-1):

(I-1)

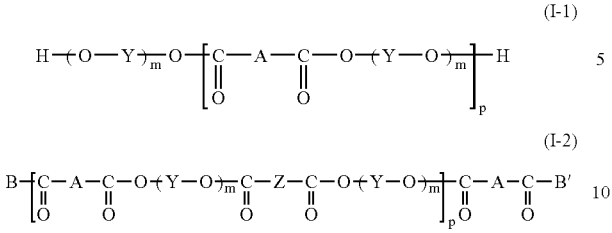

(I-2)

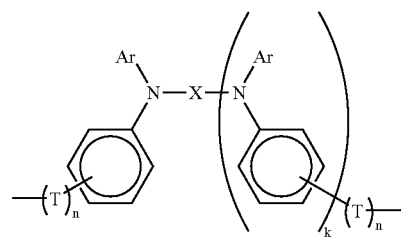

wherein A represents a structure represented by the following formula (II-1); Y and Z represent divalent hydrocarbon groups; B and B' each independently represents a group represented by —O—(Y—O)m-H or —O—(Y—O)m-CO-Z-CO—OR', wherein R' is a hydrogen atom, an aralkyl group, a substituted or non-substituted aryl group, or a substituted or non-substituted aralkyl group; m represents an integer from 1 to 5; and p represents an integer from 5 to 5000;

(II-1)

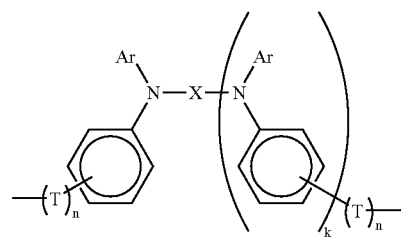

-continued (VIII-1)

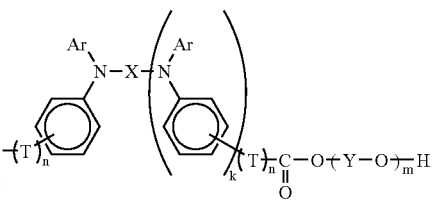

wherein Ar represents a substituted or non-substituted monovalent aromatic group; X is a divalent aromatic compound represented by the following structural formula (III-2);

(III-2)

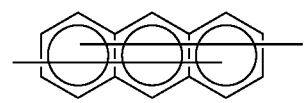

T represents a divalent linear hydrocarbon group having 1 to 6 carbon atoms or divalent branched hydrocarbon group having 2 to 10 carbon atoms; k and n each represents an integer of 0 or 1; Y represents a divalent hydrocarbon group; and m represents an integer from 1 to 5.

* * * * *